US008489572B2

(12) United States Patent
Duran et al.

(10) Patent No.: US 8,489,572 B2
(45) Date of Patent: Jul. 16, 2013

(54) SYSTEMS, METHODS, AND INTERFACES FOR RESEARCHING CONTRACTUAL PRECEDENTS

(75) Inventors: Jennifer A. Duran, Silver Spring, MD (US); James Wight, Eagan, MN (US); Heidi Albers, Rosemount, MN (US); Lora C. Thody, Rochester, NY (US)

(73) Assignee: Thomson Reuters Global Resources, Barr (CH)

( * ) Notice: Subject to any disclaimer, the term of this patent is extended or adjusted under 35 U.S.C. 154(b) by 345 days.

(21) Appl. No.: 12/501,356

(22) Filed: Jul. 10, 2009

(65) Prior Publication Data

US 2010/0036816 A1 Feb. 11, 2010

Related U.S. Application Data

(60) Provisional application No. 61/134,605, filed on Jul. 11, 2008, provisional application No. 61/113,851, filed on Nov. 12, 2008.

(51) Int. Cl.
*G06F 17/30* (2006.01)
(52) U.S. Cl.
USPC ............ 707/706; 707/732; 707/754; 715/200
(58) Field of Classification Search
USPC .......................... 707/706–732, 754; 715/200
See application file for complete search history.

(56) References Cited

U.S. PATENT DOCUMENTS

| 5,488,725 | A  | * | 1/1996  | Turtle et al. ............................. 1/1 |
| 6,081,774 | A  | * | 6/2000  | de Hita et al. ...................... 704/9 |
| 6,298,342 | B1 | * | 10/2001 | Graefe et al. ................... 707/602 |
| 7,472,343 | B2 | * | 12/2008 | Vasey ............................. 715/234 |
| 7,657,522 | B1 | * | 2/2010  | Puzicha et al. ................. 707/723 |
| 7,668,812 | B1 | * | 2/2010  | Riley et al. ............. 707/999.003 |
| 8,046,344 | B2 | * | 10/2011 | Lee ................................. 707/706 |
| 2002/0024532 | A1 | * | 2/2002  | Fables et al. ................... 345/700 |
| 2003/0126136 | A1 | * | 7/2003  | Omoigui ........................ 707/10 |
| 2003/0229639 | A1 | * | 12/2003 | Carlson et al. ................. 707/100 |
| 2004/0030697 | A1 | * | 2/2004  | Cochran et al. .................... 707/9 |
| 2005/0021553 | A1 | * | 1/2005  | Romijn et al. ................. 707/102 |
| 2005/0086207 | A1 | * | 4/2005  | Heuer et al. ....................... 707/3 |
| 2005/0216451 | A1 | * | 9/2005  | Enzler et al. ...................... 707/3 |
| 2005/0256866 | A1 | * | 11/2005 | Lu et al. ............................ 707/5 |
| 2005/0256867 | A1 | * | 11/2005 | Walther et al. .................... 707/5 |
| 2005/0283468 | A1 | * | 12/2005 | Kamvar et al. .................... 707/3 |
| 2006/0004693 | A1 | * | 1/2006  | Ramanathan et al. ............ 707/2 |
| 2006/0004708 | A1 | * | 1/2006  | Hartmann et al. ................ 707/3 |
| 2006/0036568 | A1 | * | 2/2006  | Moore et al. ....................... 707/1 |
| 2007/0016559 | A1 | * | 1/2007  | Kraft .................................. 707/3 |
| 2007/0038610 | A1 | * | 2/2007  | Omoigui ........................... 707/3 |
| 2007/0156636 | A1 | * | 7/2007  | Norton et al. ...................... 707/1 |
| 2007/0162424 | A1 | * | 7/2007  | Jeh et al. ............................ 707/2 |
| 2008/0005064 | A1 | * | 1/2008  | Sarukkai ........................... 707/3 |
| 2008/0162498 | A1 | * | 7/2008  | Omoigui ......................... 707/10 |
| 2009/0089246 | A1 | * | 4/2009  | Chi .................................... 707/3 |

(Continued)

*Primary Examiner* — Hanh Thai
(74) *Attorney, Agent, or Firm* — Hoffmann & Baron, LLP

(57) ABSTRACT

The present inventors, devised among other things, an exemplary method of researching provisions of contracts. The exemplary method entails receiving user selection of one or more predefined queries for contractual precedents, and executing a search of one or more databases containing agreements based on the received user selection. After executing the search, the method entails displaying a subset of the search results based on a predefined filter stored in association with an identifier for the user. The predefined filter may filter based on traits such as jurisdiction, deal size, industry, or a list of companies.

16 Claims, 40 Drawing Sheets

U.S. PATENT DOCUMENTS

| | | | |
|---|---|---|---|
| 2009/0089267 A1* | 4/2009 | Chi et al. | 707/4 |
| 2009/0089311 A1* | 4/2009 | Chi et al. | 707/102 |
| 2009/0150431 A1* | 6/2009 | Schmidt et al. | 707/103 R |
| 2009/0150866 A1* | 6/2009 | Schmidt | 717/120 |
| 2009/0150906 A1* | 6/2009 | Schmidt et al. | 719/317 |
| 2009/0182726 A1* | 7/2009 | Wang | 707/5 |

* cited by examiner

US 8,489,572 B2

SYSTEMS, METHODS, AND INTERFACES FOR RESEARCHING CONTRACTUAL PRECEDENTS

CROSS-REFERENCE TO RELATED APPLICATIONS

This application claims priority to U.S. Provisional Applications 61/134,605, and 61/113,851 which respectively were filed on Jul. 11, 2008 and Nov. 12, 2008. Both of these applications are incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2008, Thomson Global Resources.

TECHNICAL FIELD

Various embodiments of the present invention concern information-retrieval systems, such as those that provide legal documents or other related content, and user interfaces for such systems.

BACKGROUND

Transactional business lawyers within the American legal system, as well as many others across the globe, are continually involved in negotiating contracts on behalf of their clients. Often times the financial values involved in the contracts is significant, for example, in the tens or hundreds of millions of dollars. In negotiating these contracts, the business lawyers are under intense time pressure to make deals happens, while also protecting the best interests of their clients.

To facilitate these high-stakes negotiations, lawyers often seek to look at previous contracts or particular provisions of previous contracts as precedents. These precedents are valuable not only for teaching lawyers contractual alternatives, but also for use as leverage in negotiations. For example, one side in a negotiation may argue that a particular indemnity clause is unconventional and the other side may argue that a particular termination clause is conventional. In either case, one side or the other may want to use precedent to support their arguments and gain a concession from the other. Unfortunately, even in law firms with a long history of negotiating high-stakes contracts, finding and leveraging available and relevant contractual or agreement precedent can be time consuming and labor intensive.

Accordingly, the present inventors identified a need for better ways of researching contractual precedents.

SUMMARY

To address this and/or other needs, the present inventors devised, among other things, systems, methods, and software that allow users to search, filter, and organize, share, and leverage contractual precedent. Moreover, the exemplary system also allows users to readily select and input contractual precedents into word-processing document, such as draft contracts.

DETAILED DESCRIPTION OF EXEMPLARY EMBODIMENTS

This description, which references and incorporates the above-identified Figures, describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Exemplary Document-Processing and Information-Retrieval System

Figure 1:
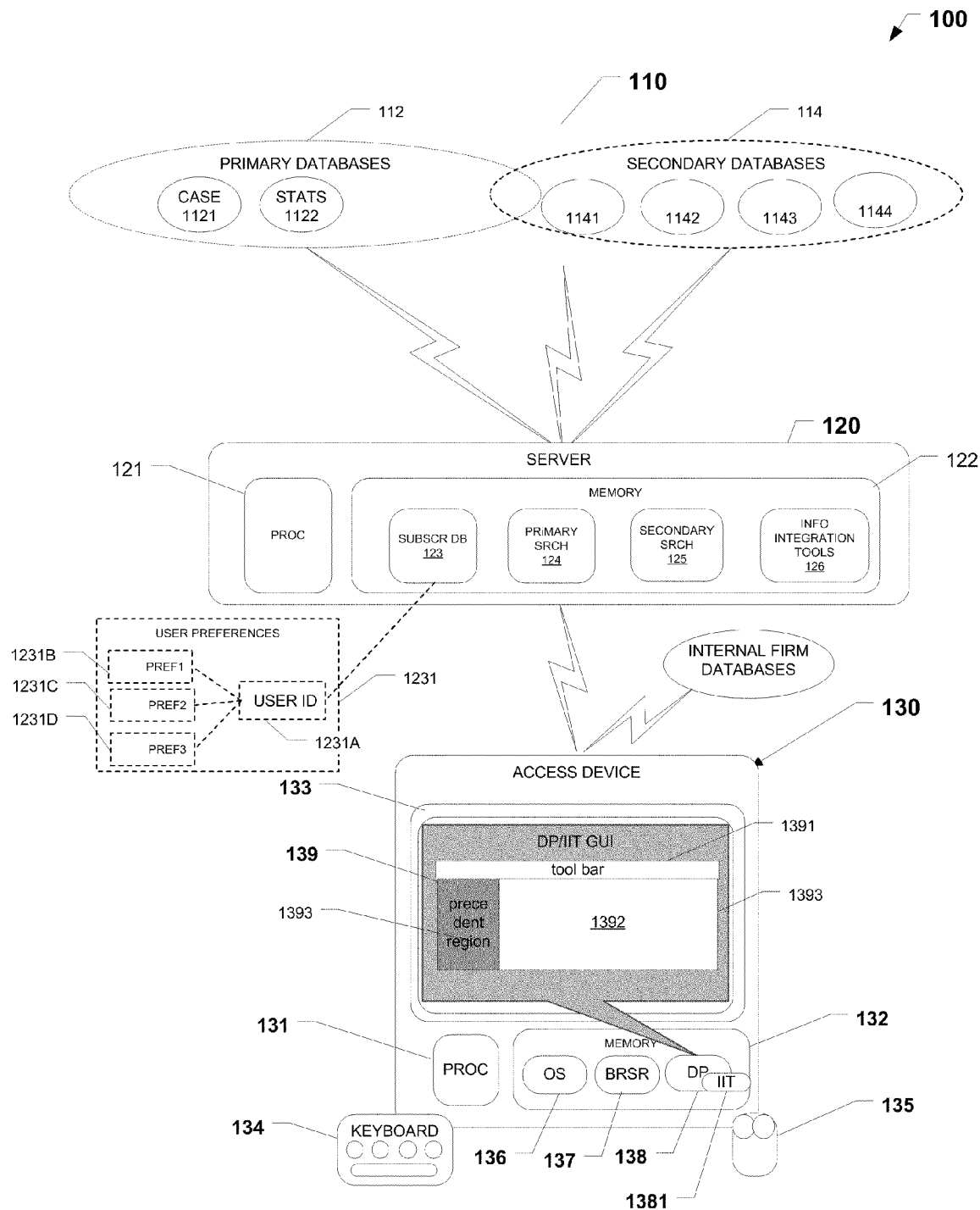
FIG. 1 is a block diagram of an exemplary information-retrieval and contract drafting system 100, which corresponds to one or more embodiments of the present invention.

FIG. 1 shows an exemplary document-processing and information-retrieval system 100. System 100 includes one or more databases 110, one or more servers 120, and one or more access devices 130.

Exemplary Databases

Databases 110 includes a set of primary databases 112 and a set of second databases 114. Primary databases 112, in the exemplary embodiment, include a caselaw database 1121 and a statutes databases 1122, which respectively include judicial opinions and statutes from one or more local, state, federal, and/or international jurisdictions. Secondary databases 114, provide attorney, judge, law firm, product, corporate profiles, and industry and financial databases, such as SEC (Securities and Exchange Commission) filings, including contracts and agreements. Each corporate profiles include one or more industry classification codes or indicators that facilitates association of industry and corporate identifiers with particular documents, such as agreements as well as portions of those documents. In some embodiments, the caselaw documents are logically associated via a data structure with documents or profiles in databases 114. Other embodiments may include non-legal databases that include financial, scientific, or health-care information. Still other embodiments provide public or private databases, such as those made available through WESTLAW, INFOTRAC, and more generally any open web or Internet content.

Databases 110, which take the exemplary form of one or more electronic, magnetic, or optical data-storage devices, include or are otherwise associated with respective indices (not shown). Each of the indices includes terms and phrases in association with corresponding document addresses, identifiers, and other conventional information. Databases 110 are coupled or couplable via a wireless or wireline communications network, such as a local-, wide-, private-, or virtual-private network, to server 120.

Exemplary Server

Server 120, which is generally representative of one or more servers for serving data in the form of webpages or other markup language forms with associated applets, ActiveX controls, remote-invocation objects, or other related software and data structures to service clients of various "thicknesses." More particularly, server 120 includes a processor module 121, a memory module 122, a subscriber database 123, a primary search module 124, a secondary search module 125, and an contractual research and drafting module 126.

Processor module 121 includes one or more local or distributed processors, controllers, or virtual machines. In the exemplary embodiment, processor module 121 assumes any convenient or desirable form.

Memory module 122, which takes the exemplary form of one or more electronic, magnetic, or optical data-storage devices, stores subscriber database 123, search module 124, secondary search module 125, and contractual research and drafting module 126.

Subscriber database 123 includes subscriber-related data for controlling, administering, and managing pay-as-you-go or subscription-based access of databases 110. In the exemplary embodiment, subscriber database 123 includes one or more preference data structures, of which data structure 1231 is representative. Data structure 1221 includes a customer or user identifier portion 1231A, which is logically associated with one or more operational, configuration, or usage preferences or associated data for contractual research and drafting module 126, such as preferences 1231B, 1231C, and 1231D.

Preference 1231B includes a default value governing whether functionality of module 126 is enabled or disabled for the associated user or customer. Preference 1231C includes one or more user defined search results filters for filtering contractual precedent research results via industry, company name list, deal size, clause type, and/or one or more other traits as well as identifiers for other users with whom the filters may be shared as well as their access rights with respect to the folders. Preference 1231D includes one or more precedent storage folders associated with the user as well as identifiers for other users with whom the folders may be shared as well as their access rights with respect to the folders default values governing one or more other aspects of usage or operation or configuration of the information-integration tools within module 126.

Primary search module 124 includes one or more search engines and related user-interface components, for receiving and processing user queries against one or more of databases 110. In the exemplary embodiment, one or more search engines associated with search module 124 provide Boolean, tf-idf, natural-language search capabilities.

Secondary module 125 includes one or more search engines for receiving and processing queries against one or more of databases 114. Some embodiments charge a separate or additional fee for searching and/or accessing documents from the secondary databases.

Contractual research and drafting module 126 includes machine readable and/or executable instruction sets for wholly or partly defining software and related user interfaces, some of which have one or more portions thereof that integrate or cooperate with one or more document-processing applications. Exemplary document-processing (or document-authoring or -editing) applications include word-processing applications, email applications, presentation applications, and spreadsheet applications. (More about the module 126 is described below.) In the exemplary embodiment, these applications would be hosted on one or more accesses devices, such as access device 130. (Other functionality of module 126 is described below.)

Exemplary Access Device

Access device 130 is generally representative of one or more access devices. In the exemplary embodiment, access device 130 takes the form of a personal computer, workstation, personal digital assistant, mobile telephone, or any other device capable of providing an effective user interface with a server or database. Specifically, access device 130 includes a processor module 13 lone or more processors (or processing circuits) 131, a memory 132, a display 133, a keyboard 134, and a graphical pointer or selector 135.

Processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, document processing software 138. (In the exemplary embodiment, memory 132 also includes document management software and time and billing system software not shown in the FIG. 1. In some embodiments, this software may be hosted on a separate server.)

In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of graphical user interfaces on display 133. In the exemplary embodiment, document processing software 138 includes Microsoft Word word processing software, Powerpoint presentation software, Excel spreadsheet software, and Outlook email software. Document processing software is shown integrated with one or more portions 1381 of contract research and draft module 126, which are downloaded from server 120 via a wired or wireless communication link. Upon launching of the document processing software an integrated document-processing and information-retrieval graphical-user interface 139 is defined in memory 132 and rendered on display 133.

Upon rendering, interface 139 presents data in association with one or more interactive control features (or user-interface elements). In the exemplary embodiment, each of these control features takes the form of a hyperlink or other browser-compatible command input. User selection of some control features results in retrieval and display of at least a portion of the corresponding document within a region of interface 138 (not shown in this figure.) Although FIG. 1 shows regions as being simultaneously displayed, some embodiments present them at separate times.

Figure 2:
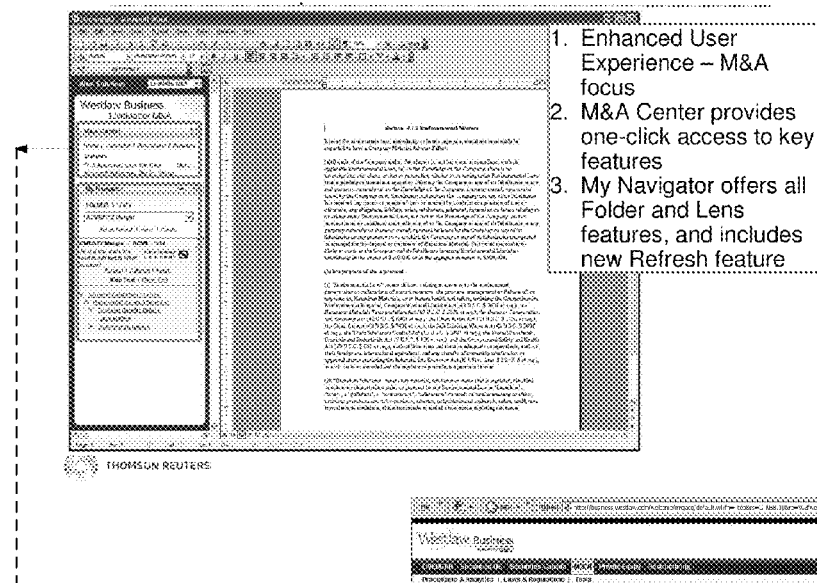
FIG. 2 is a facsimile of an exemplary graphical user interface 200 which may be incorporated into system 100 and which corresponds to one or more embodiments of the present invention.
Figure 2:
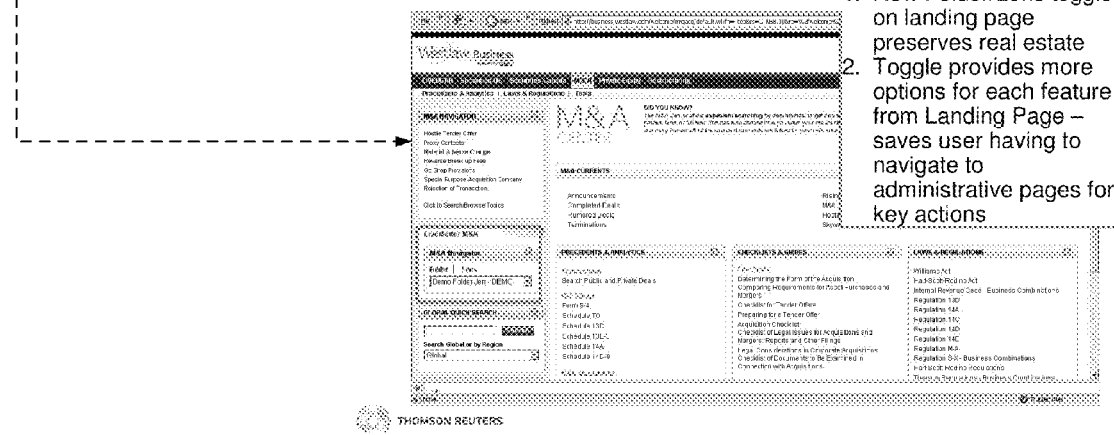

FIG. 2 shows an exemplary form of interface 139.

Exemplary Method(s)

Figure 3:
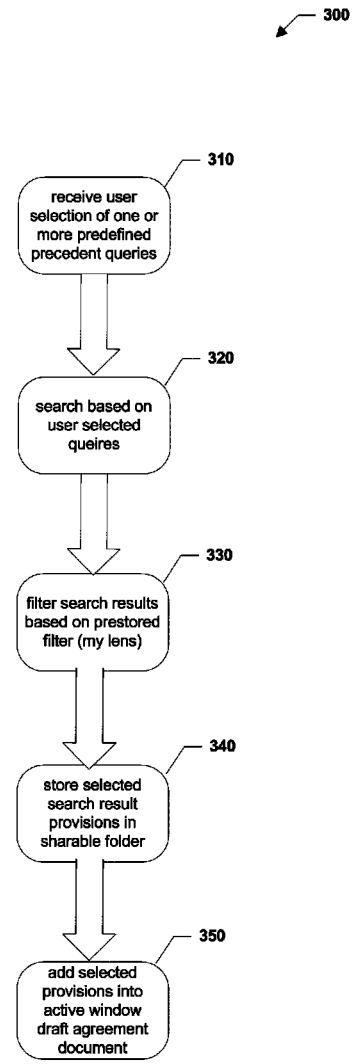
FIG. 3 is a flow chart of an exemplary method of operating system 100, which corresponds to one or more embodiments of the present invention.
Figure 4:
FIGS. 4-40 are facsimiles of graphical user interfaces that form a portion of system 100 and also embody one or more methods, all corresponding to one or more embodiments of the present invention.
Figure 5:
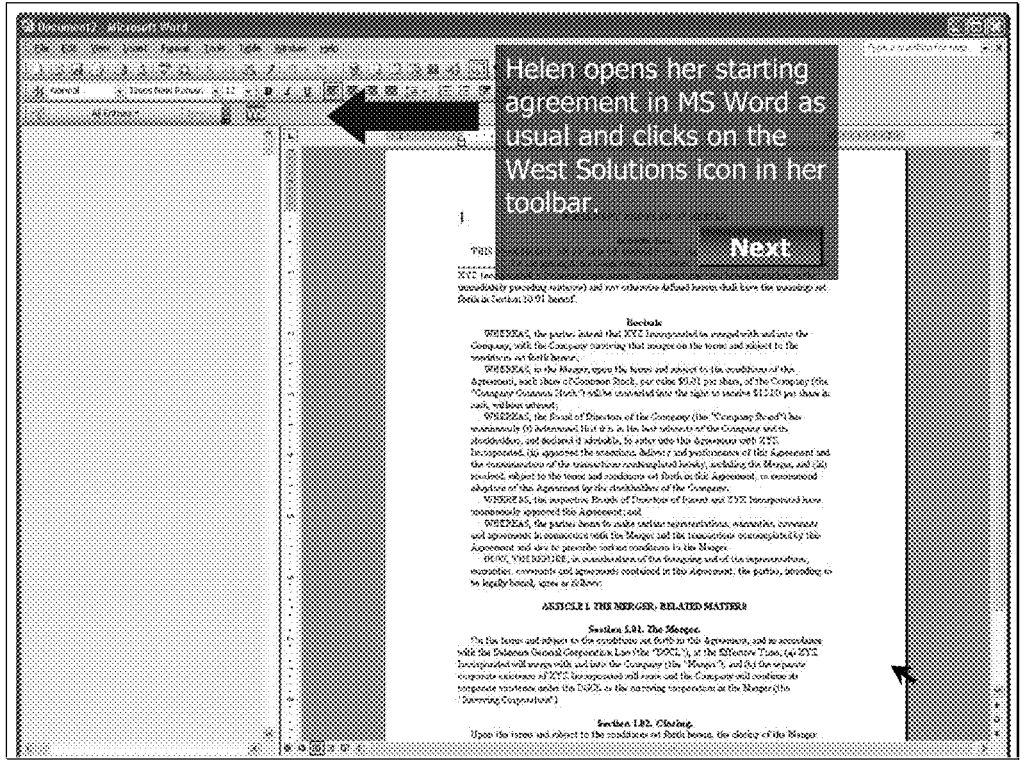
Figure 6:
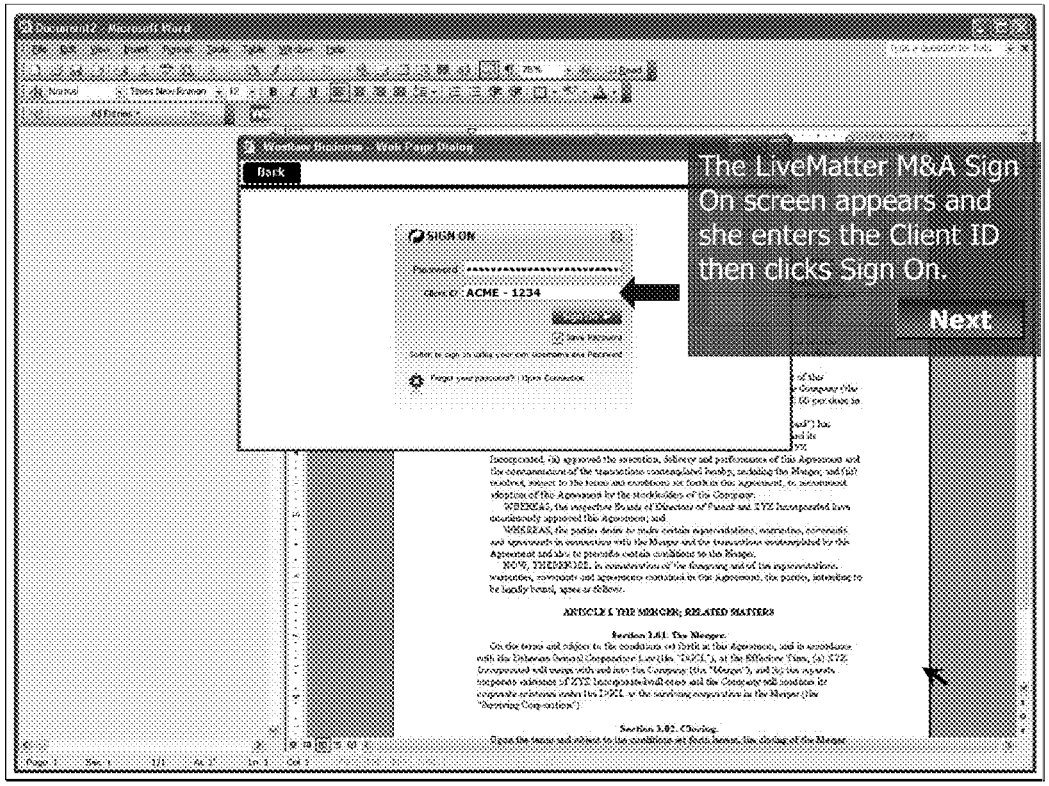
Figure 7:
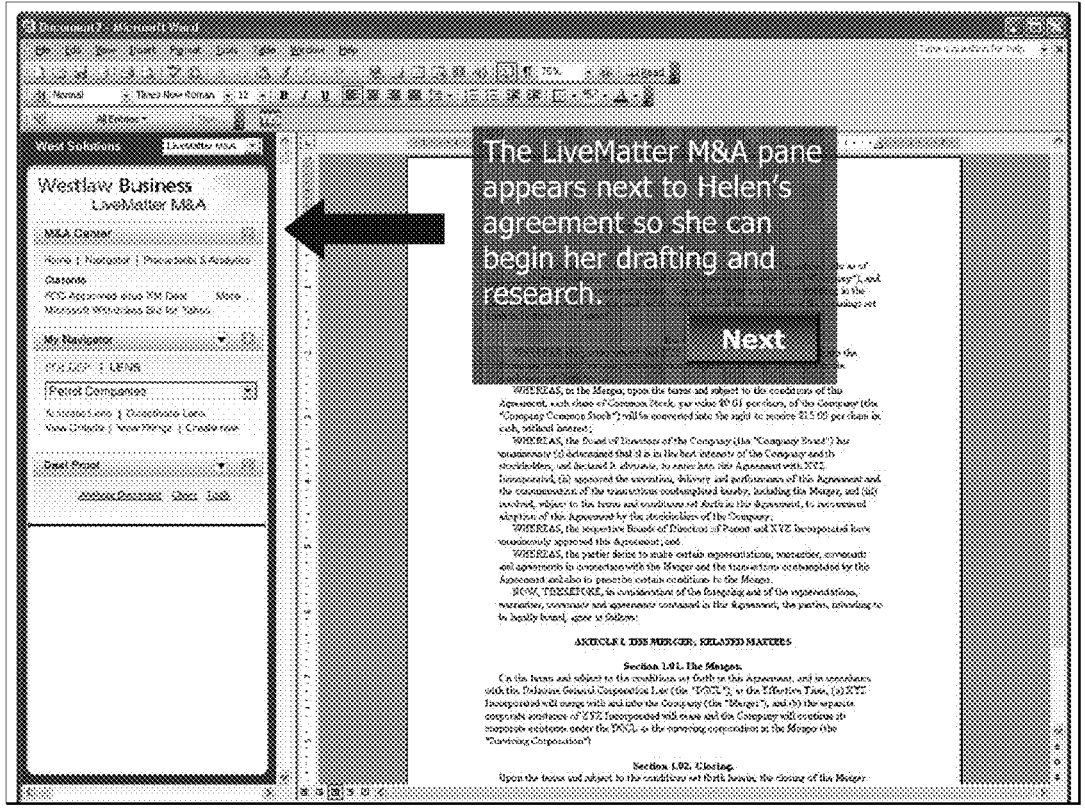
Figure 8:
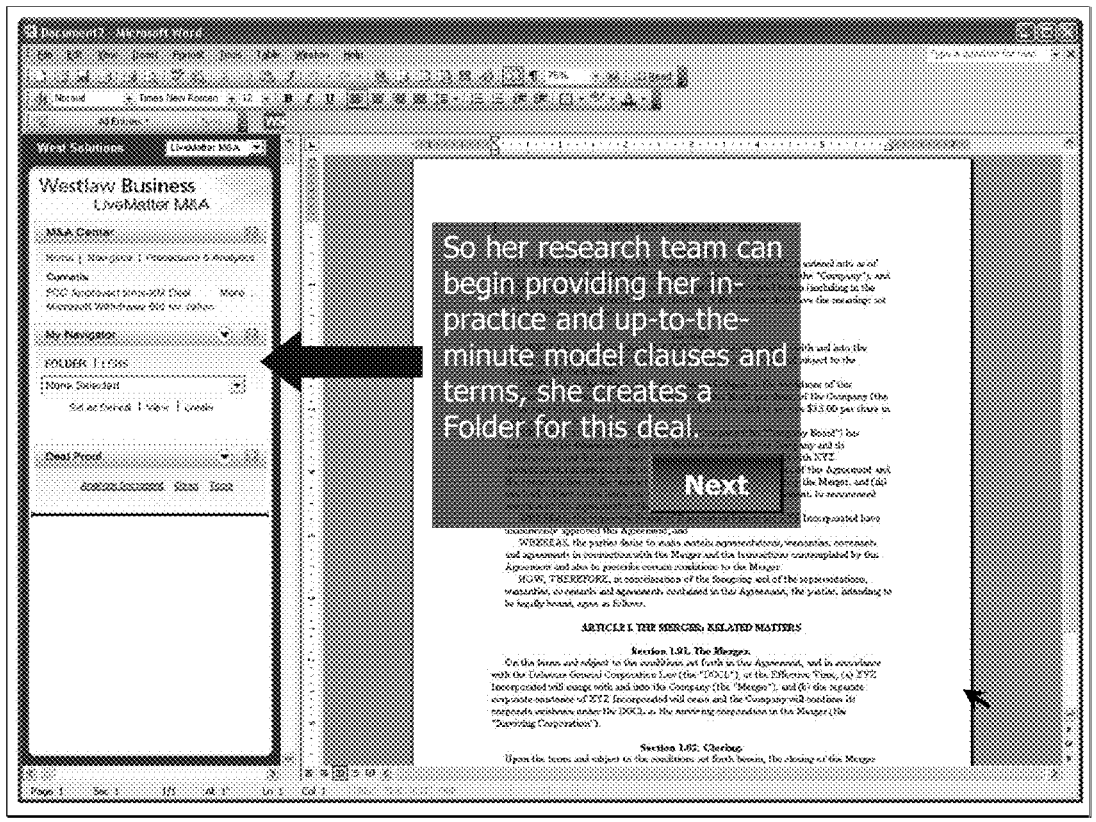
Figure 9:
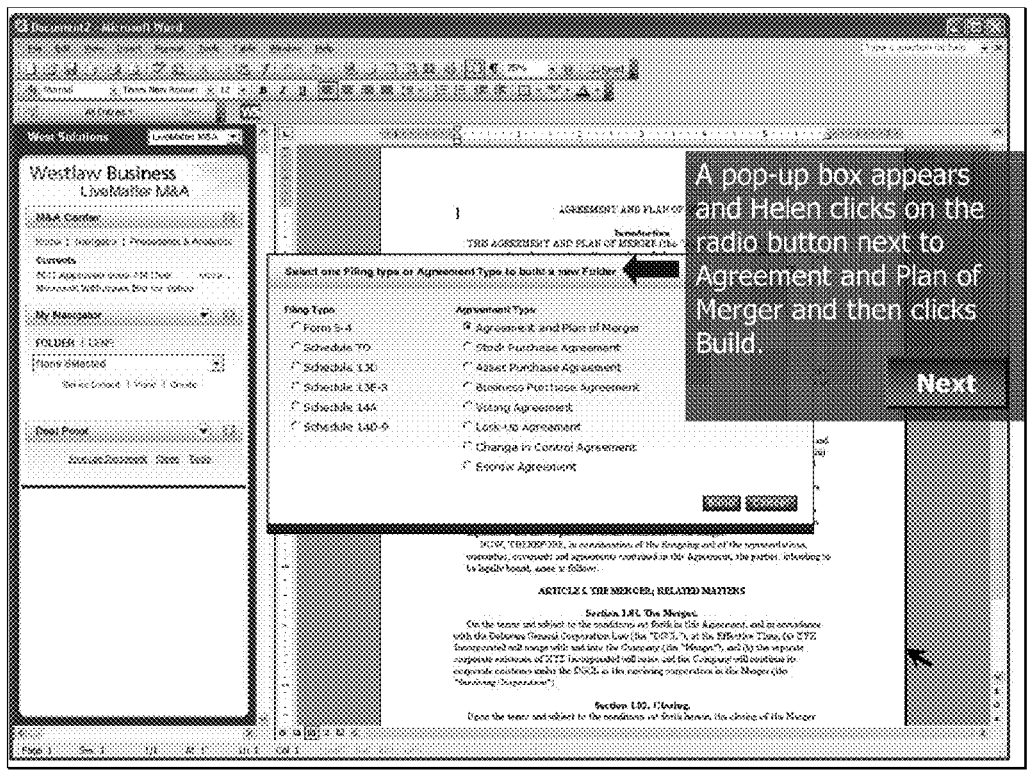
Figure 10:
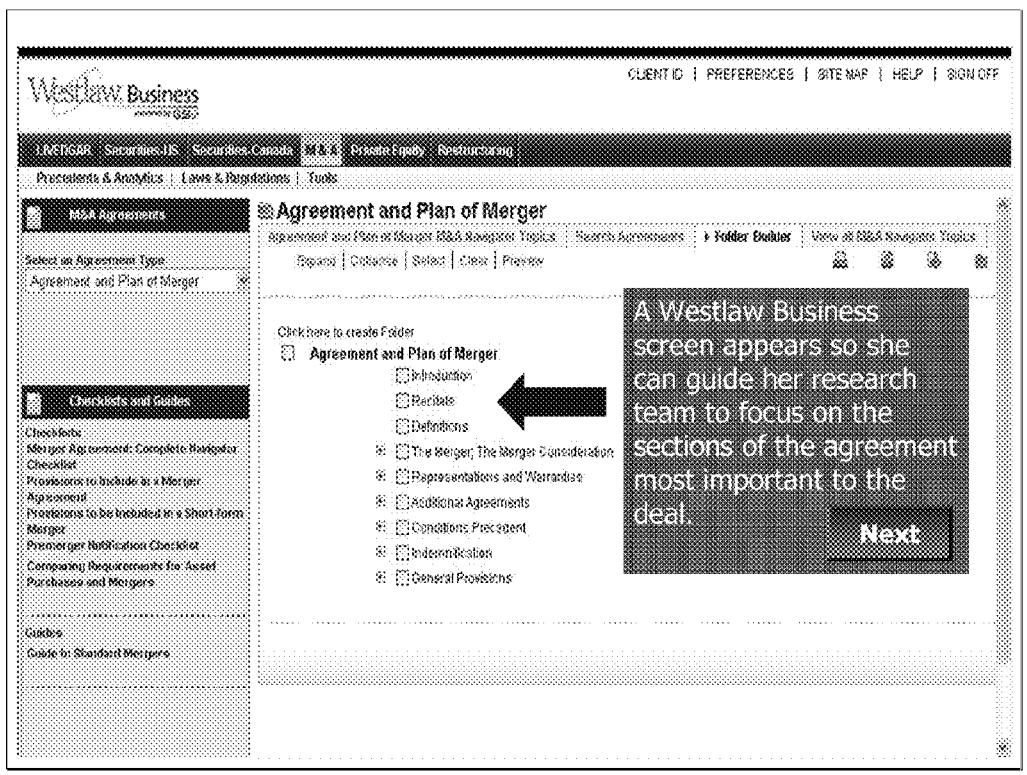
Figure 11:
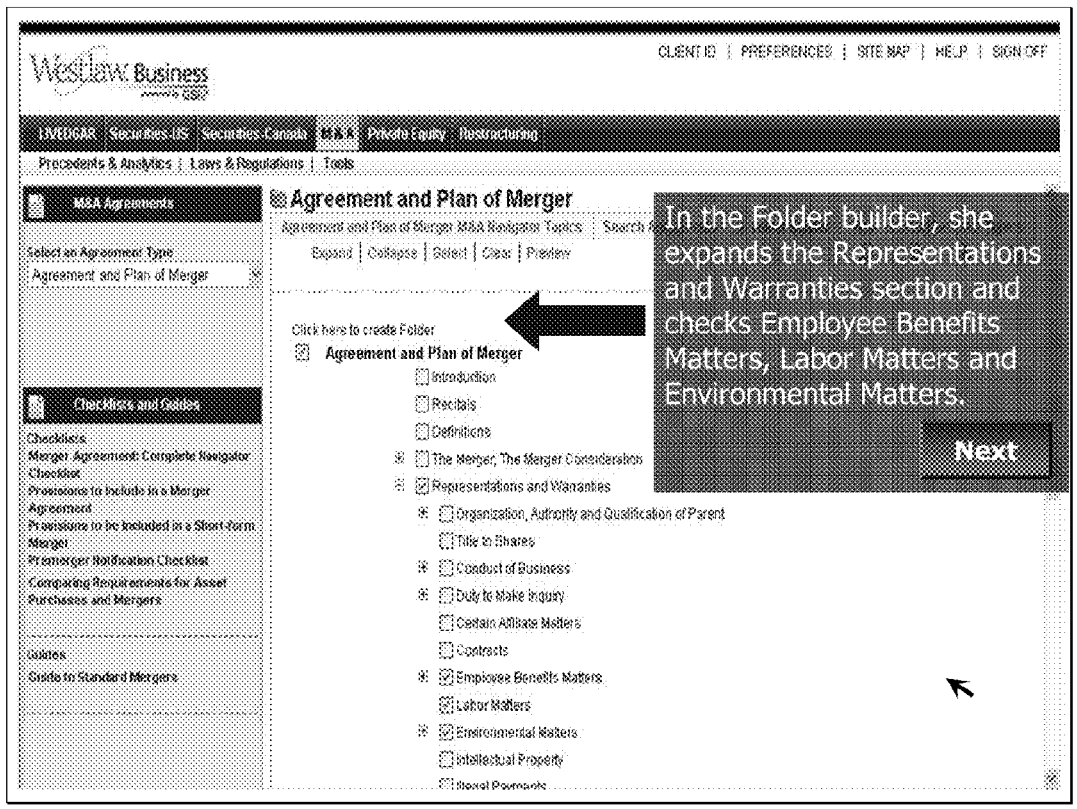
Figure 12:
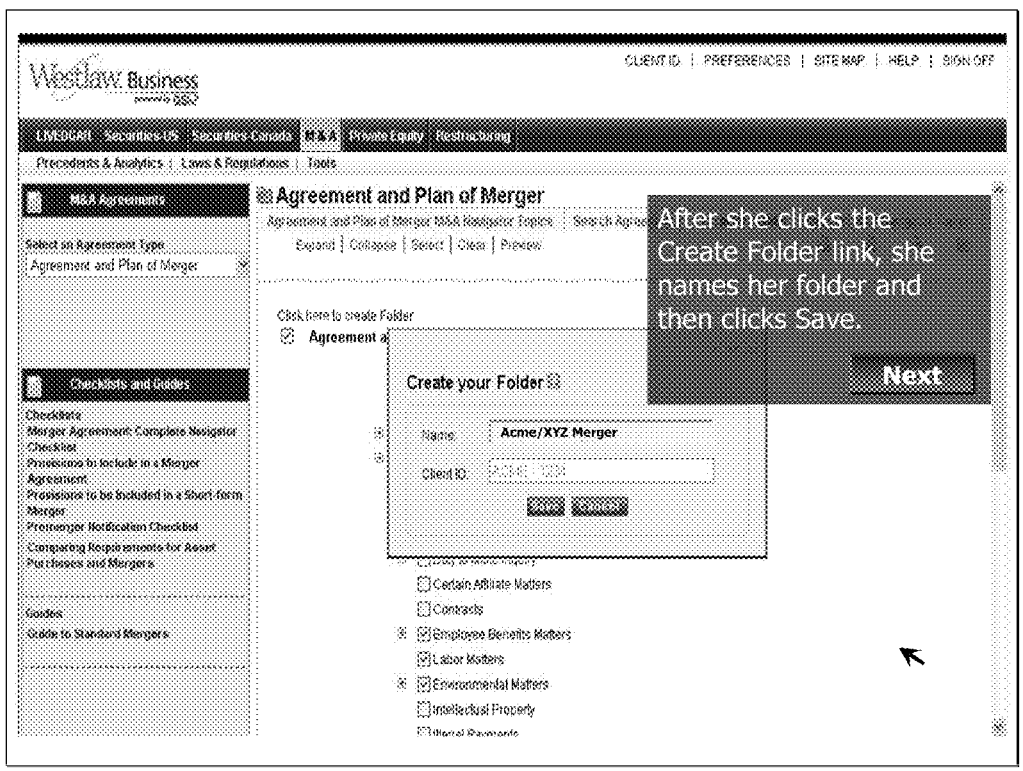
Figure 13:
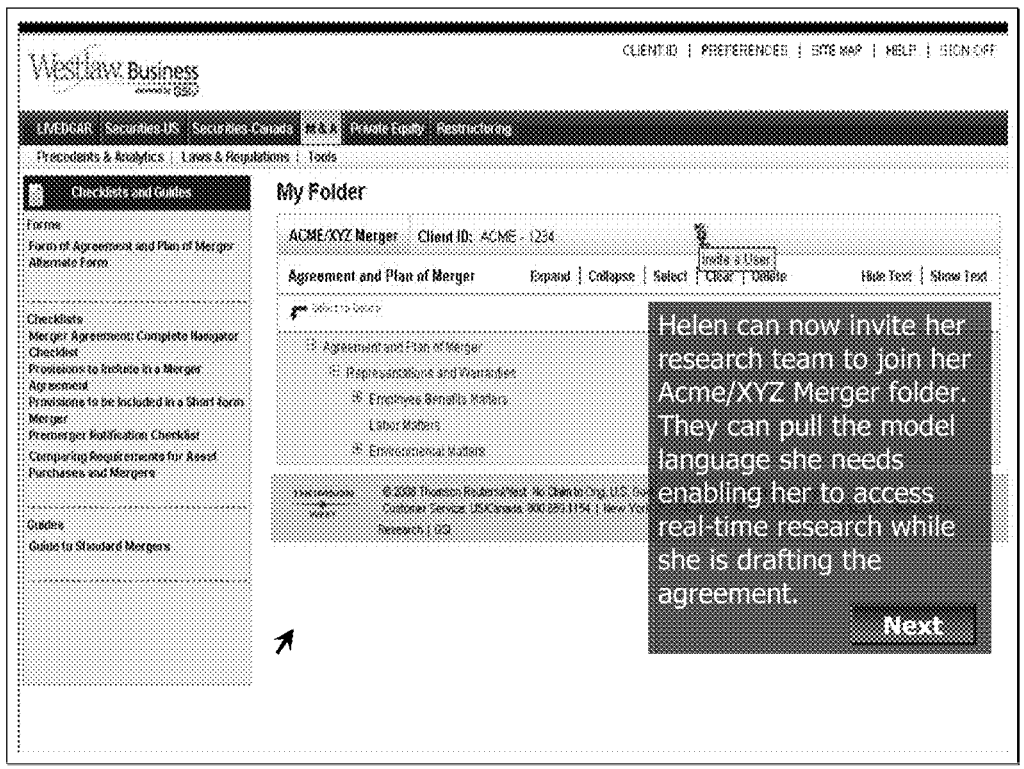
Figure 14:
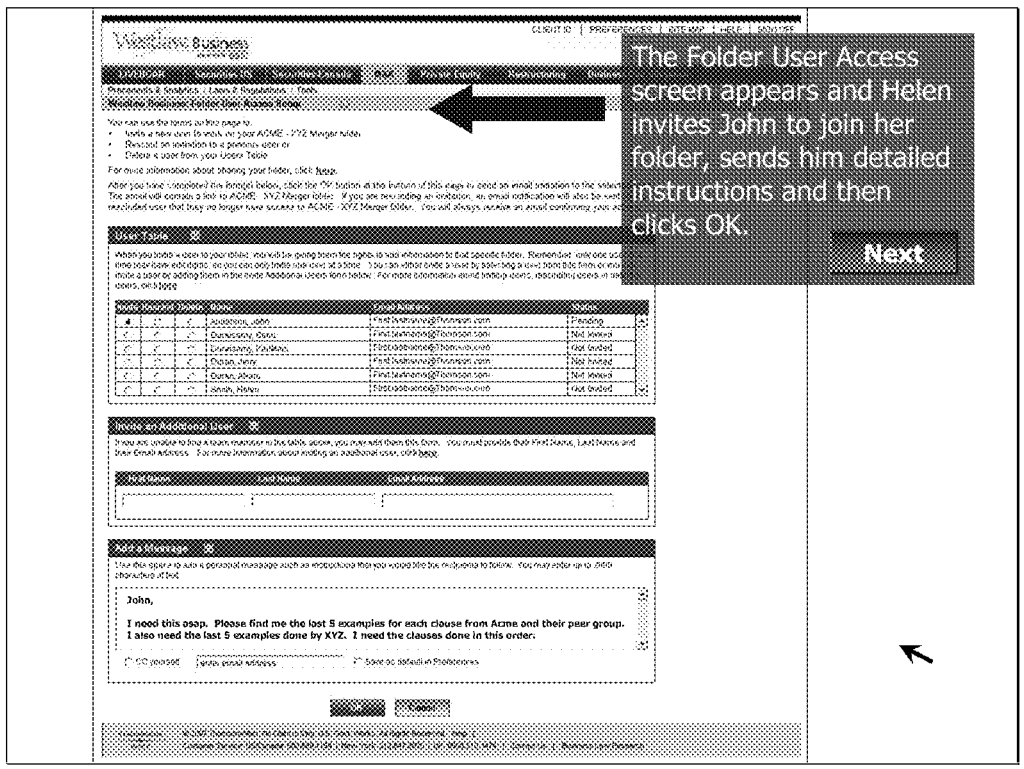
Figure 15:
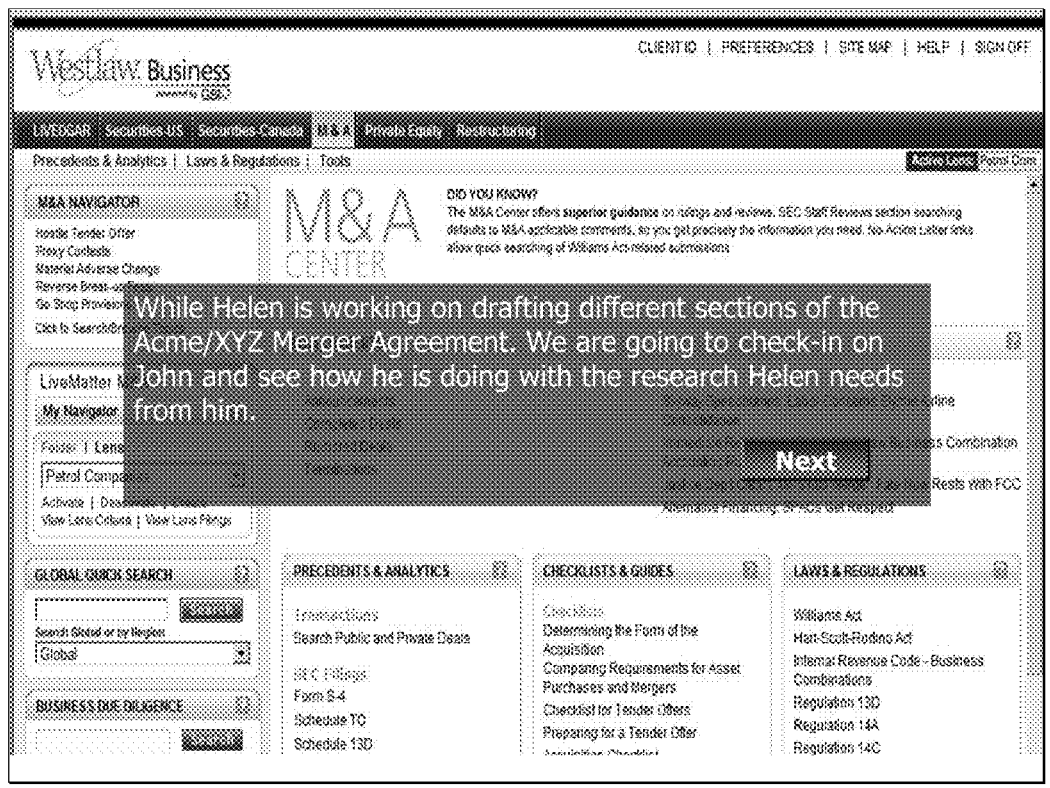
Figure 16:
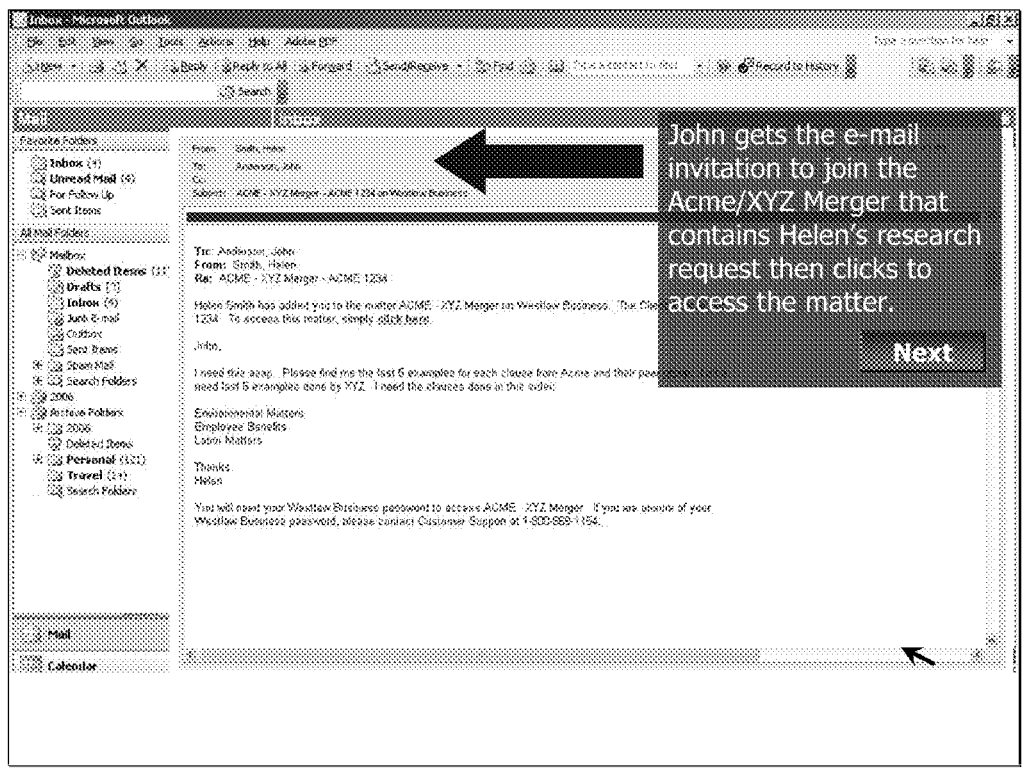
Figure 17:
Figure 18:
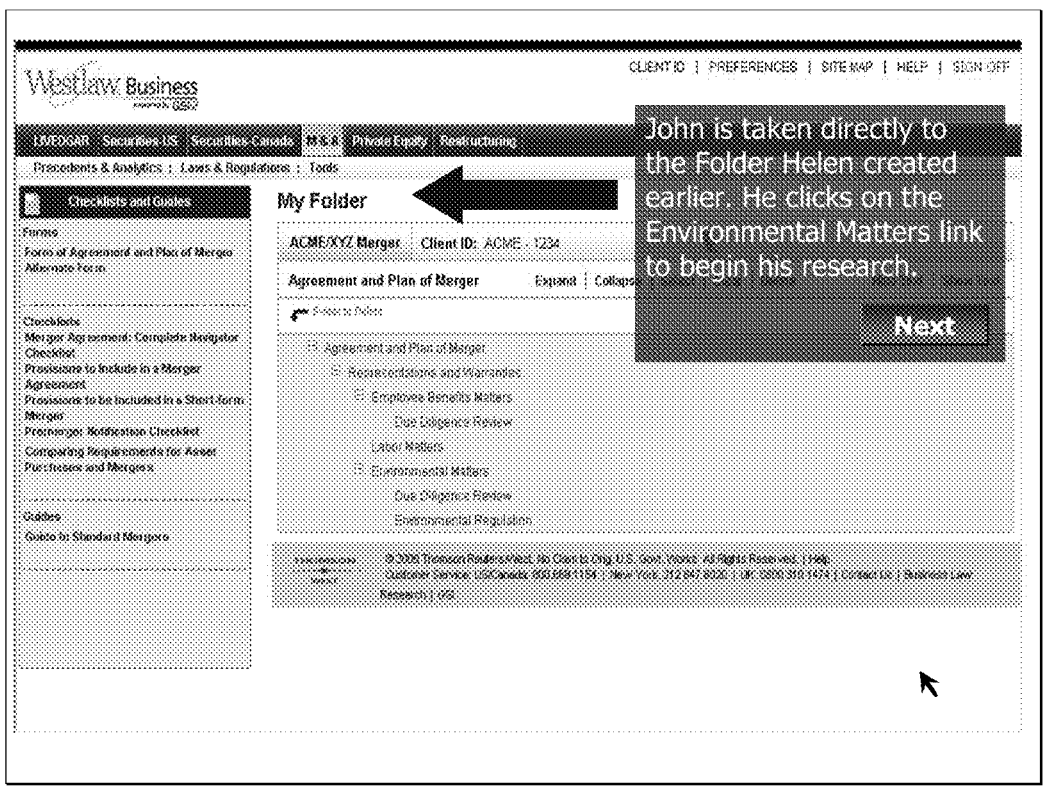
Figure 19:
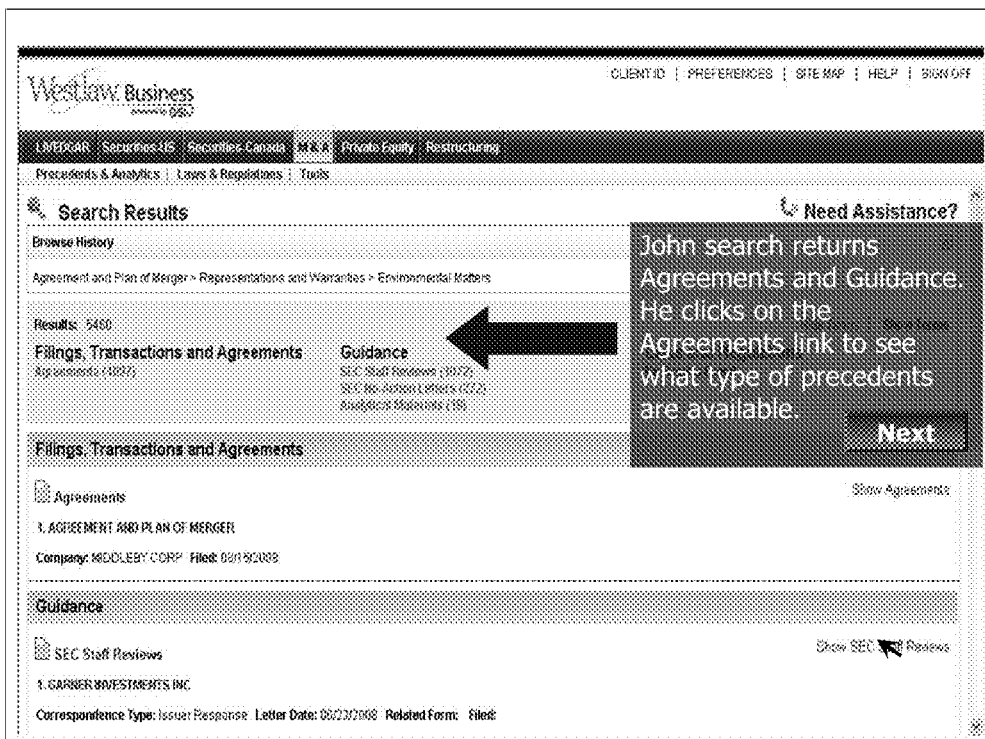
Figure 20:
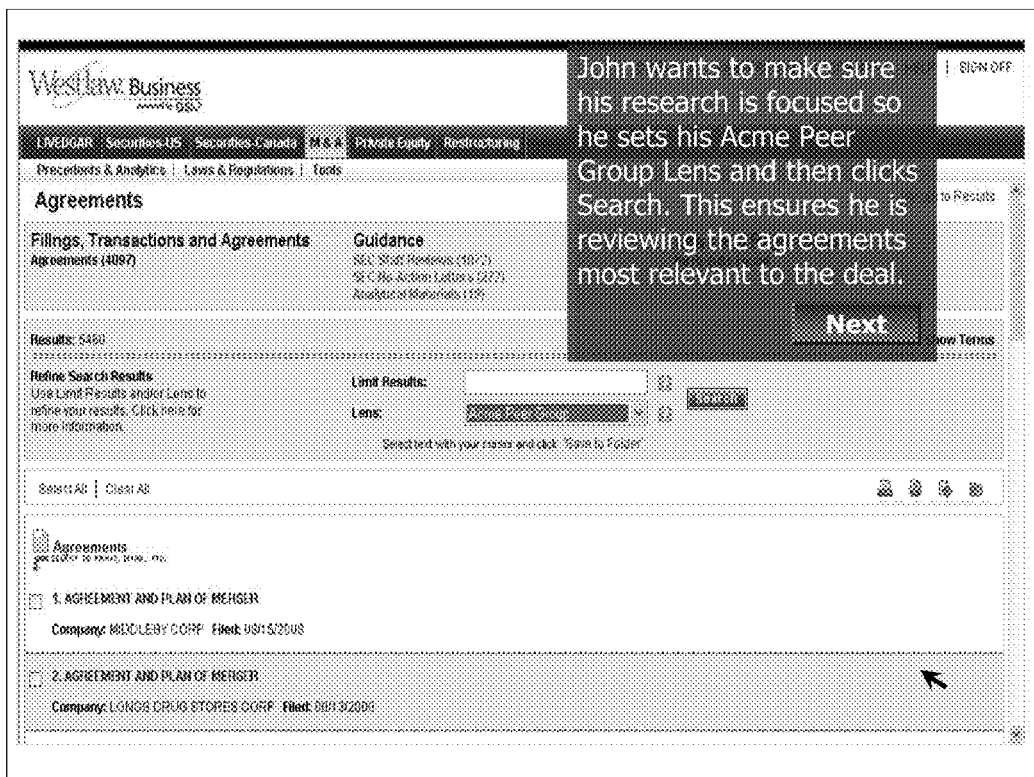
Figure 21:
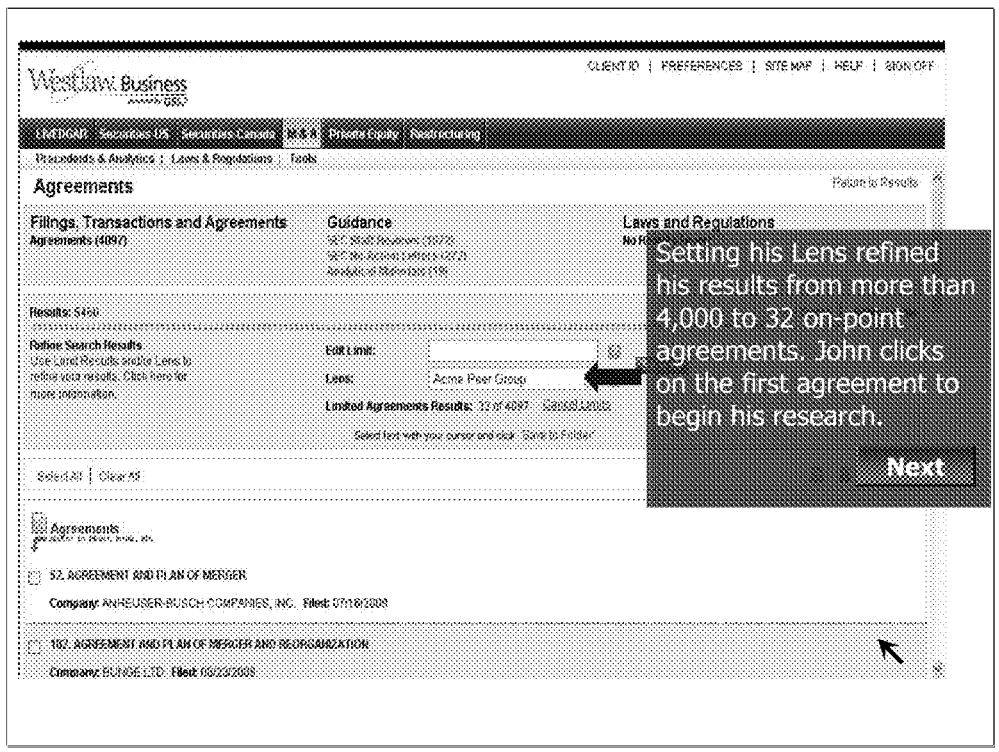
Figure 22:
Figure 23:
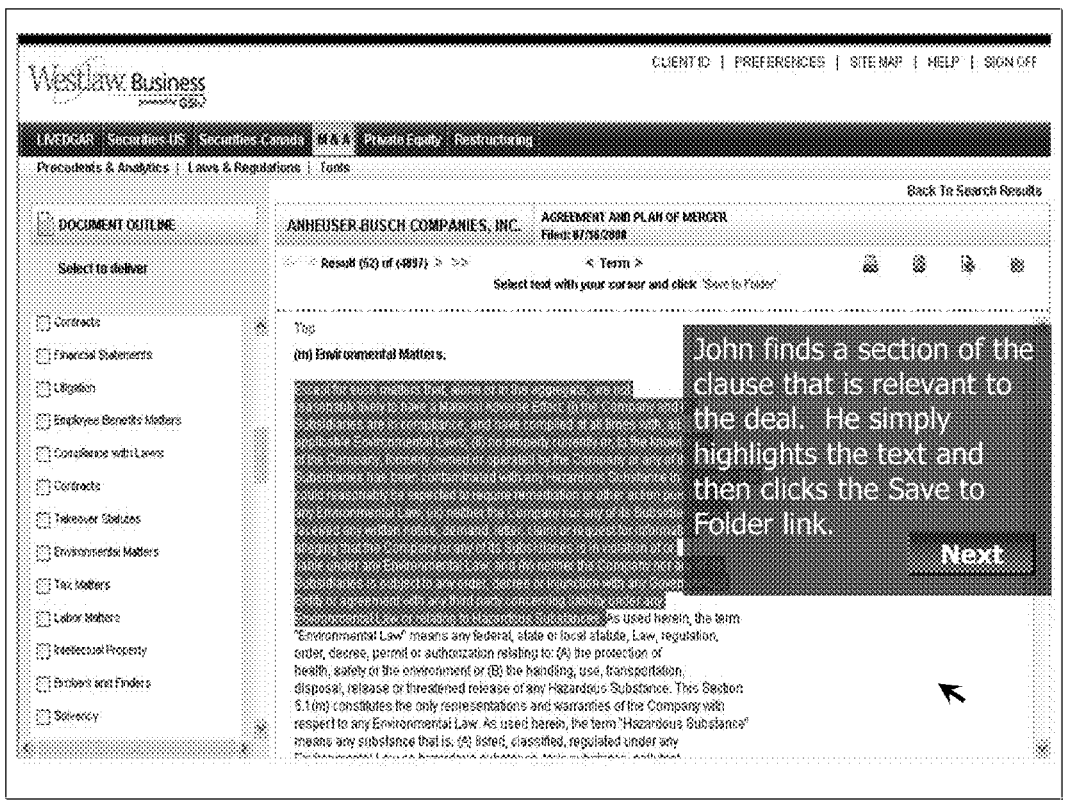
Figure 24:
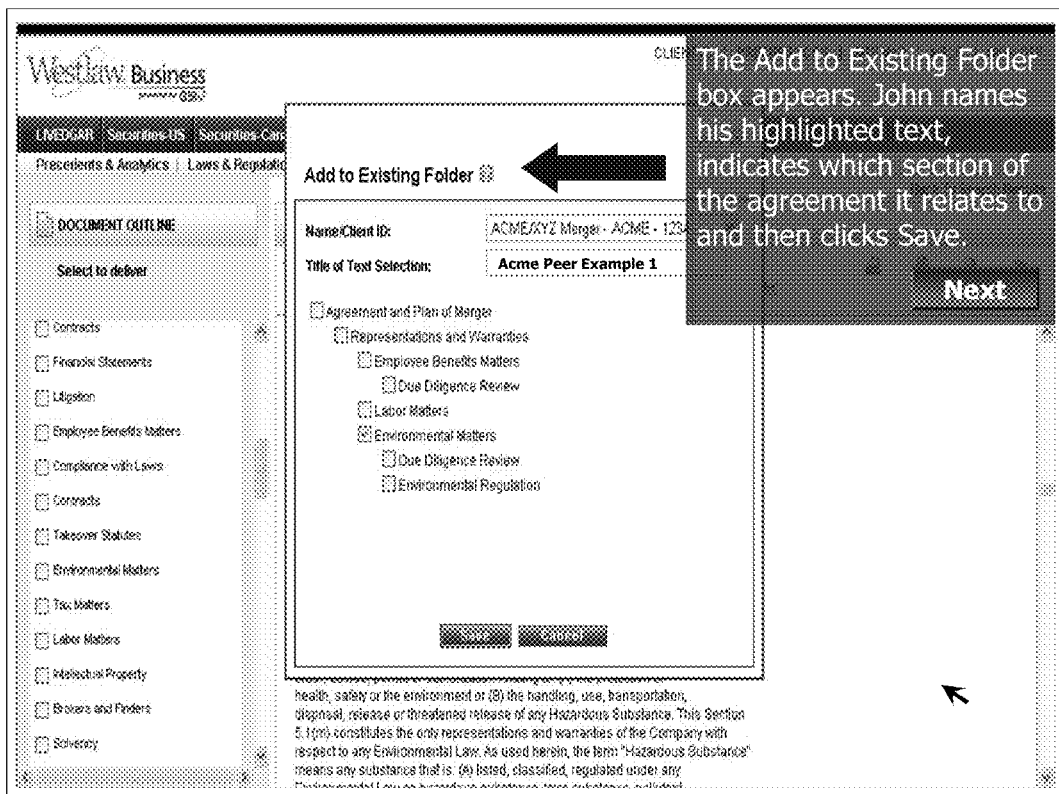
Figure 25:
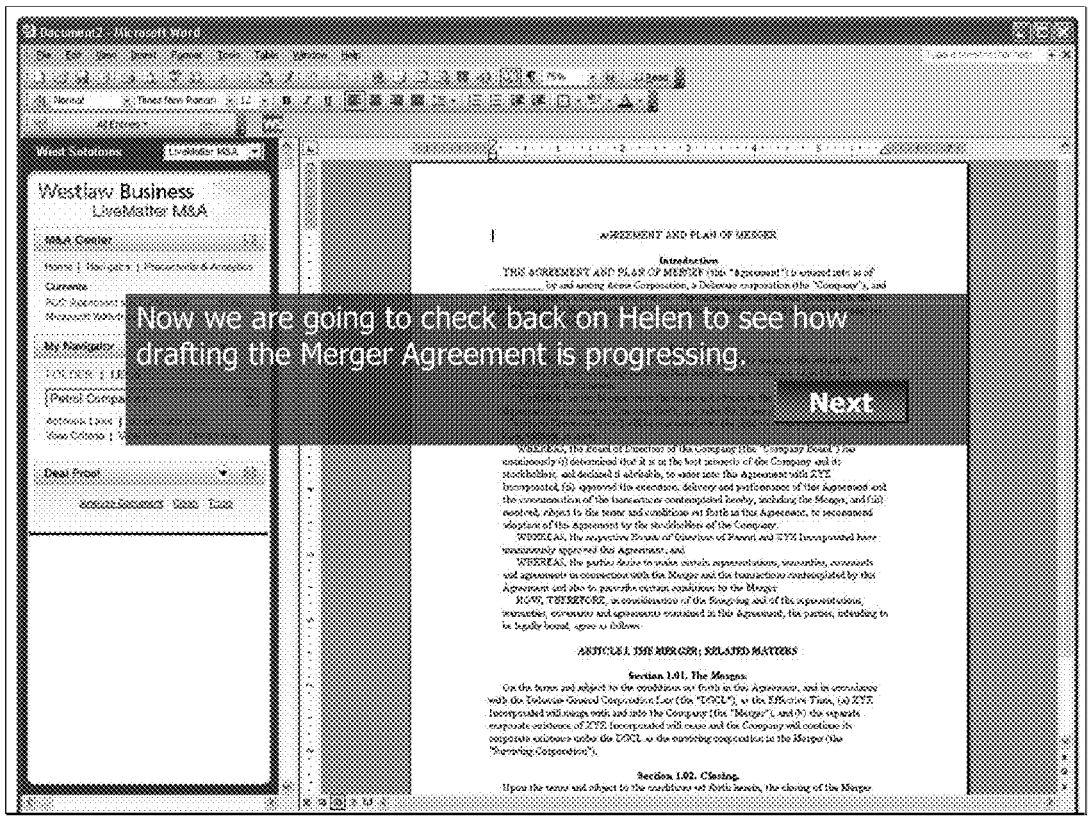
Figure 26:
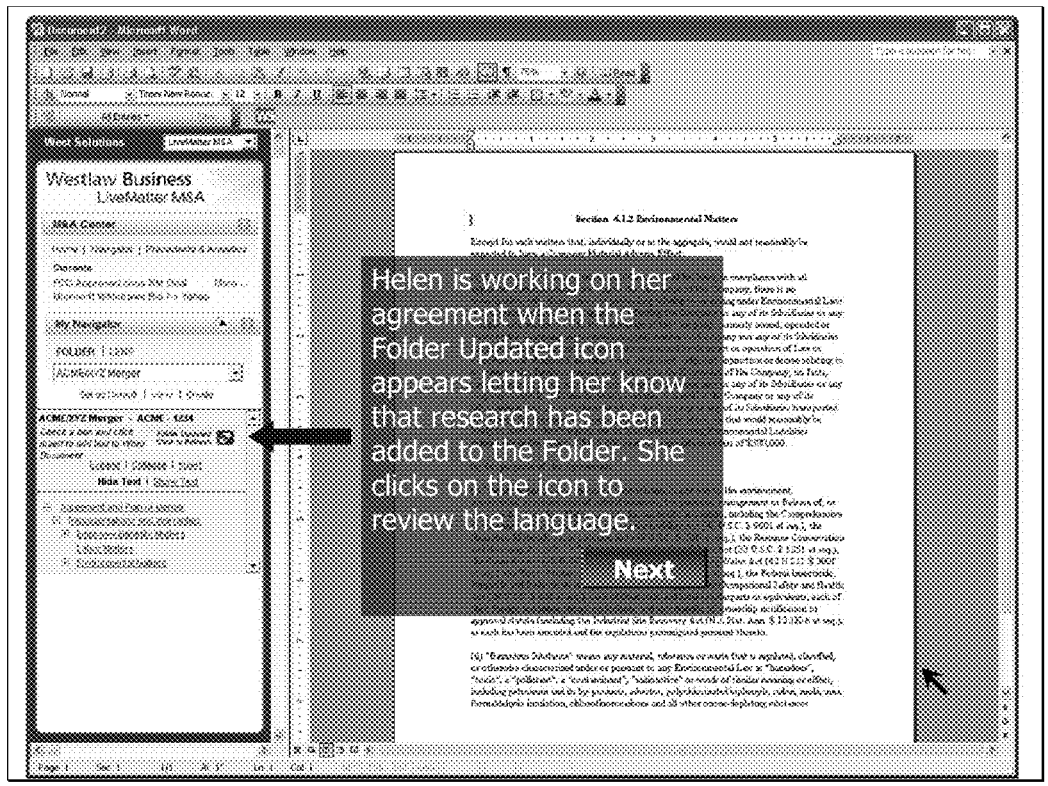
Figure 27:
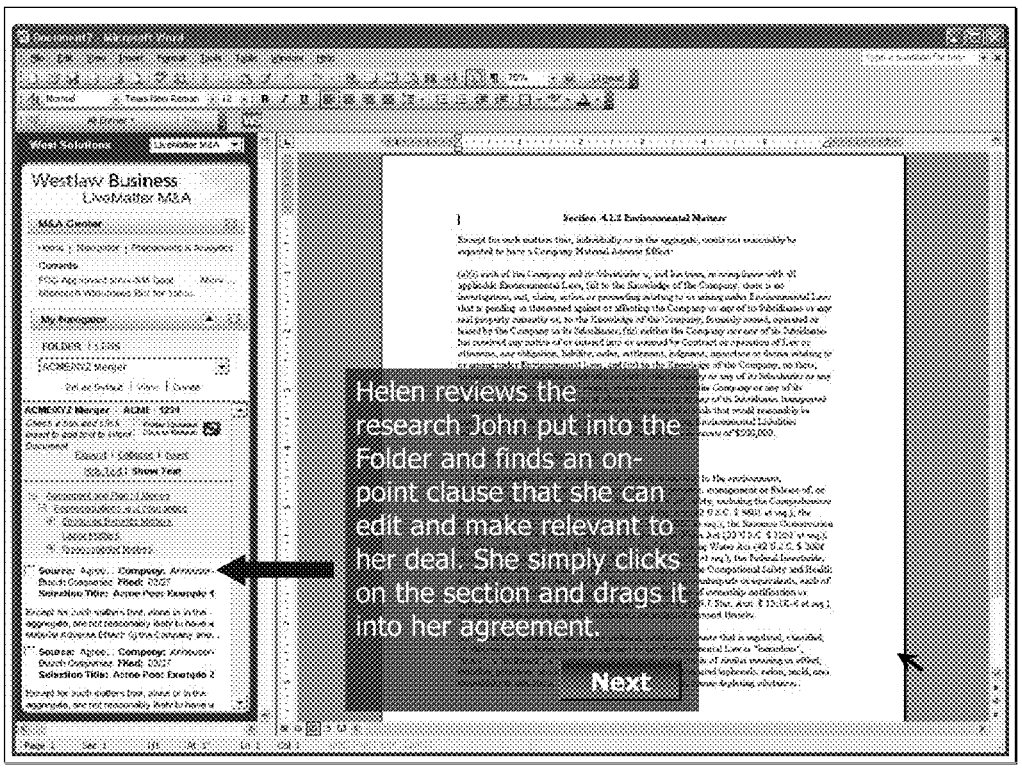
Figure 28:
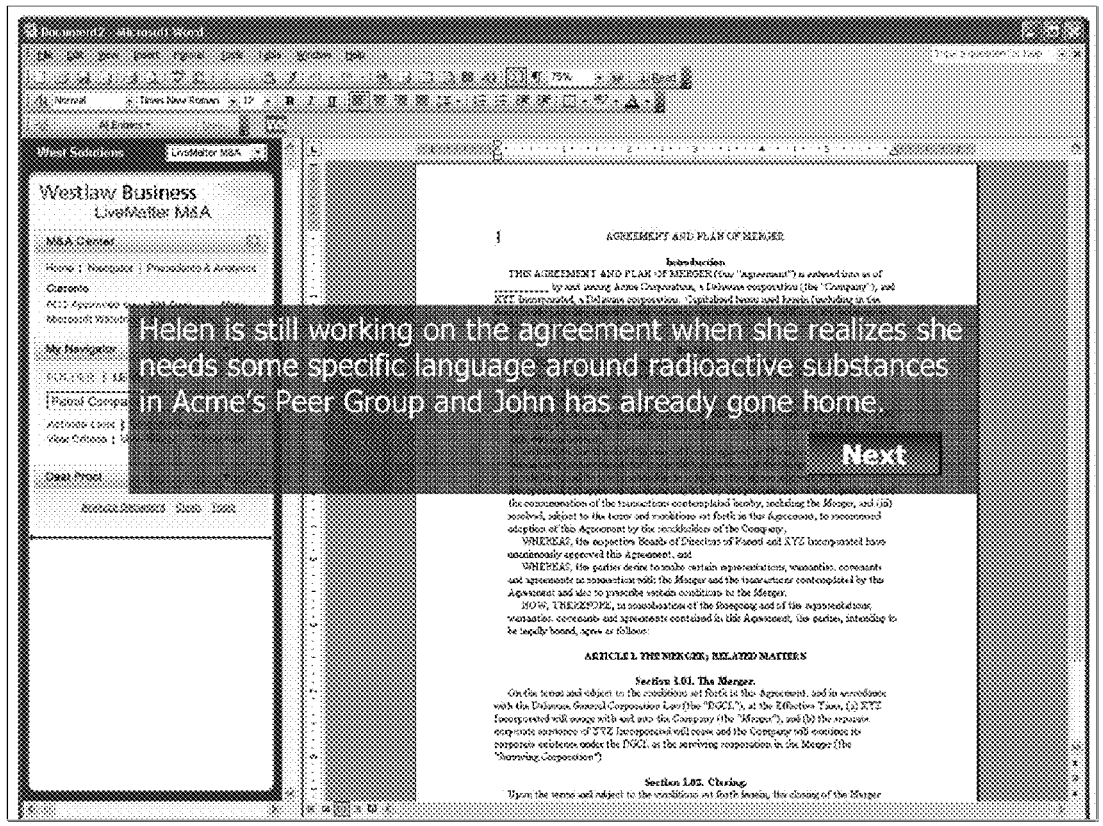
Figure 29:
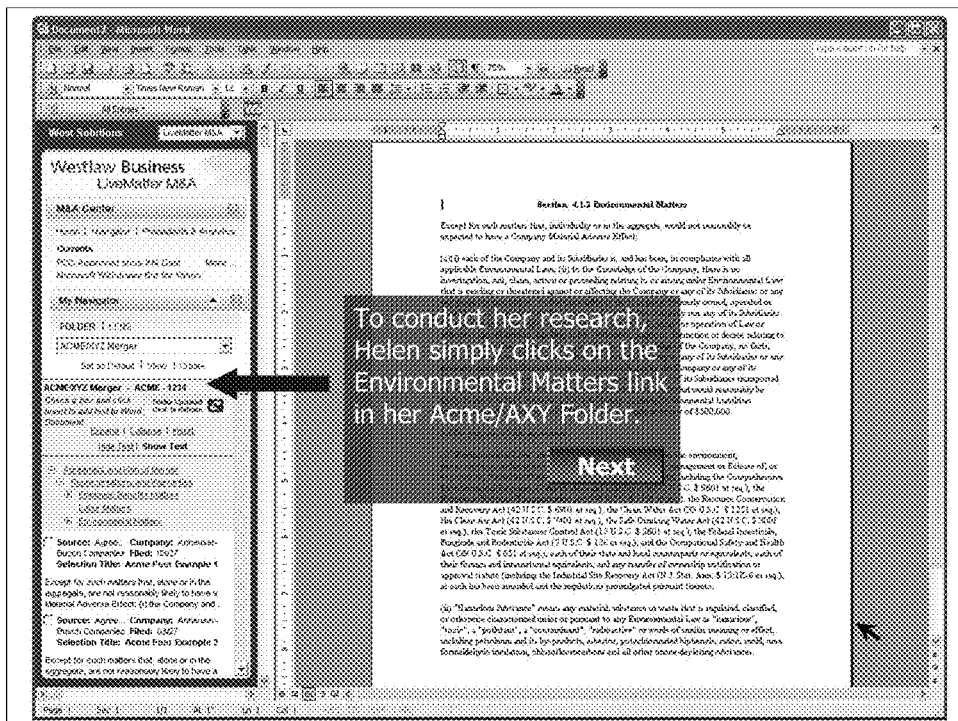
Figure 30:
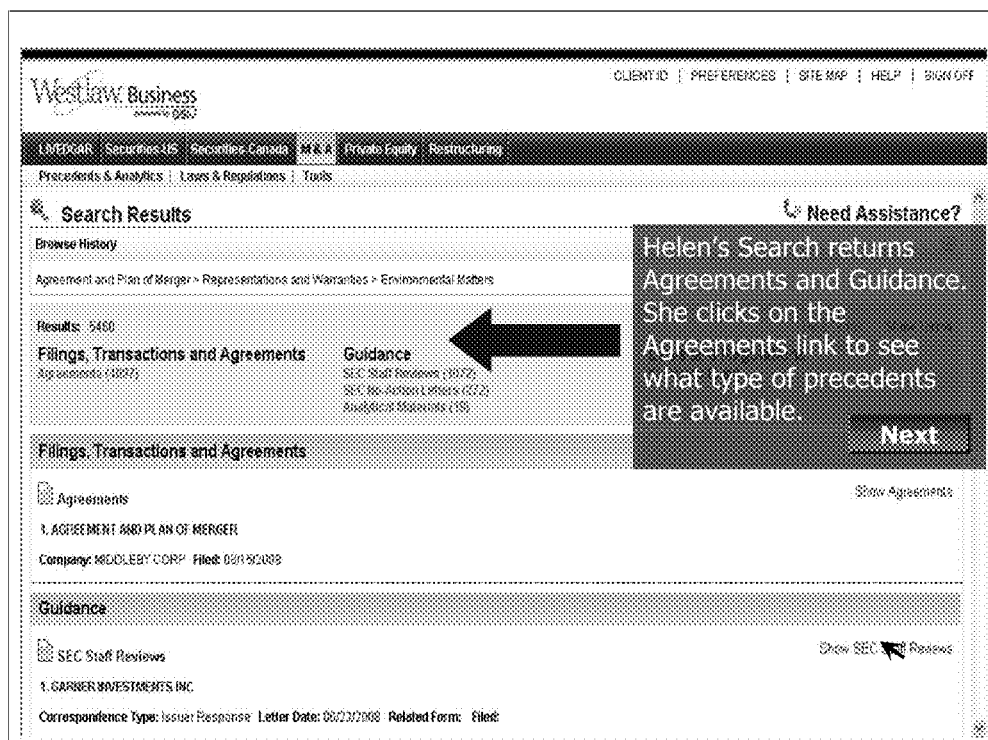
Figure 31:
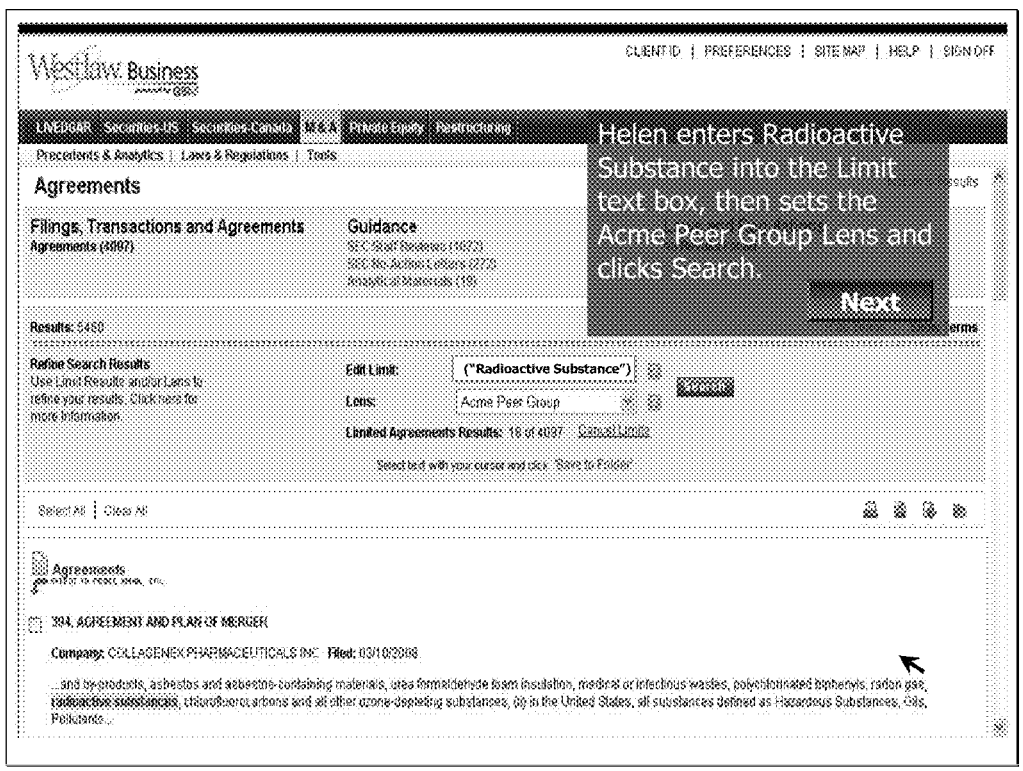
Figure 32:
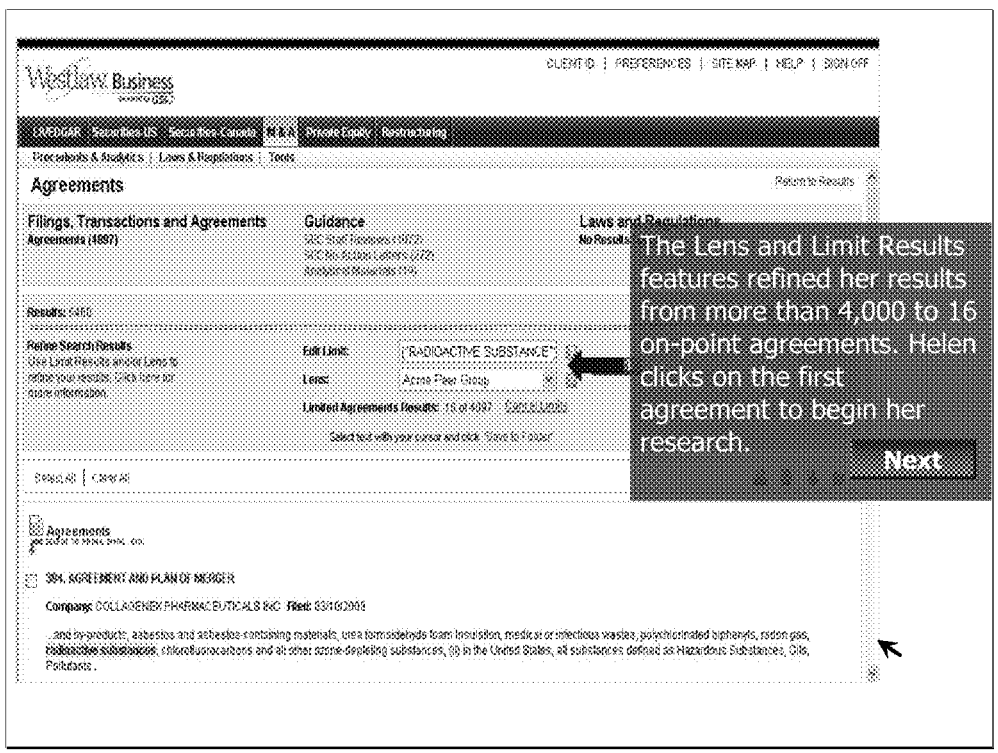
Figure 33:
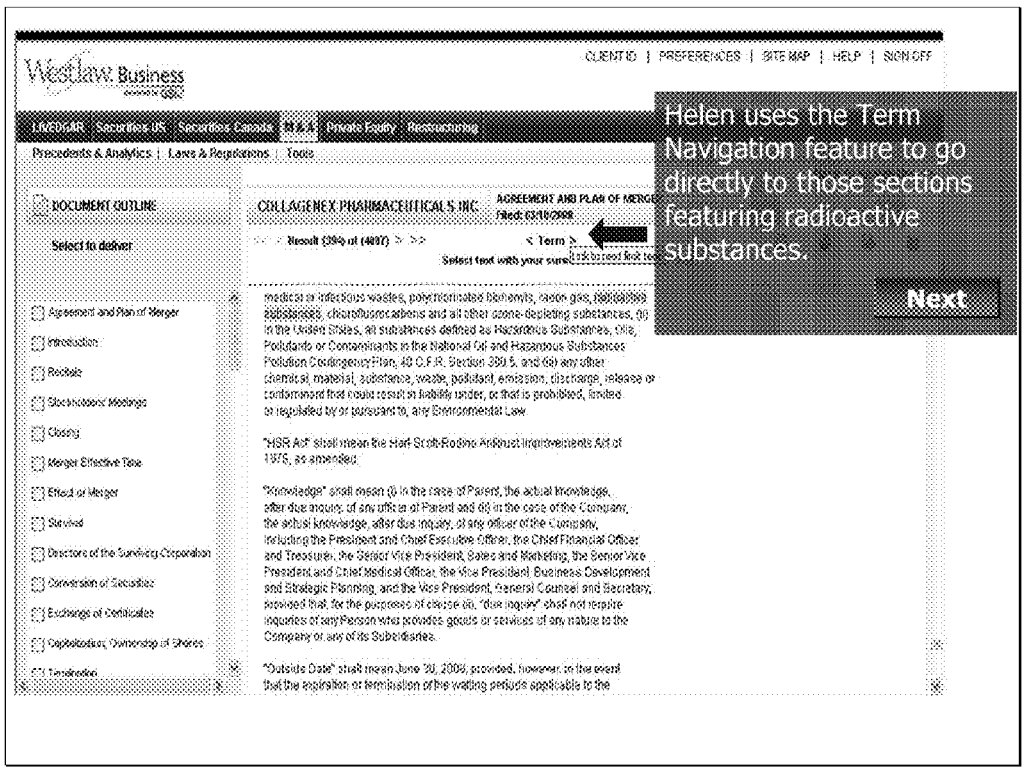
Figure 34:
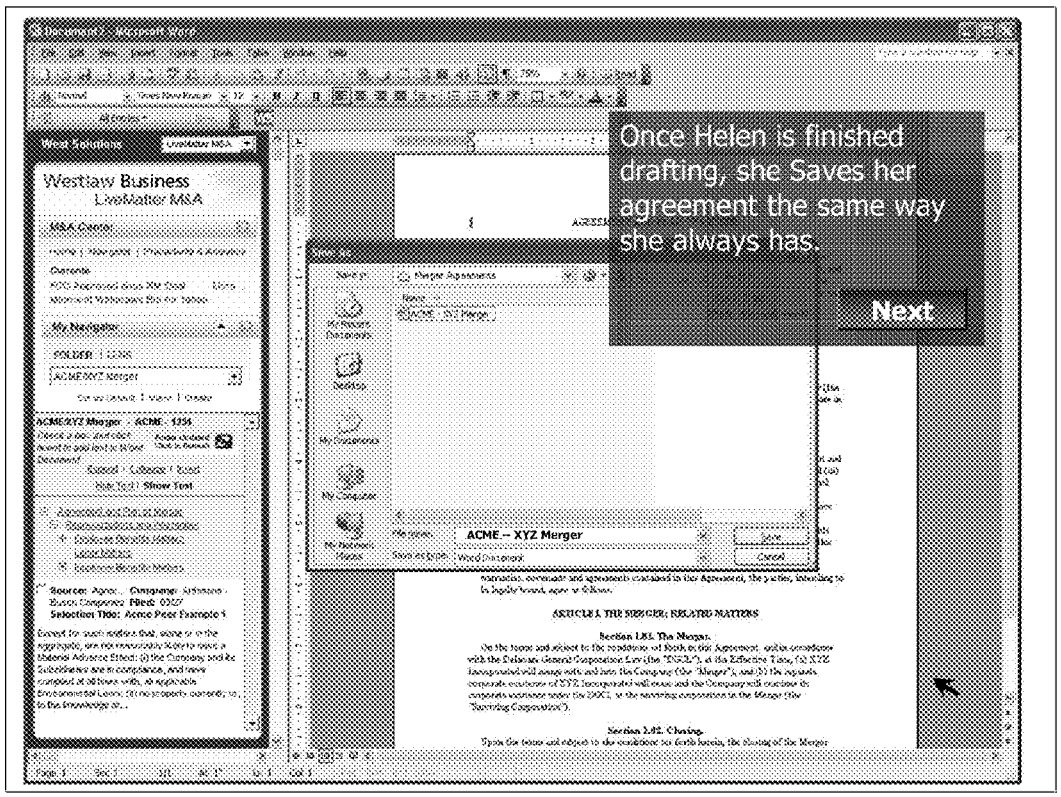
Figure 35:
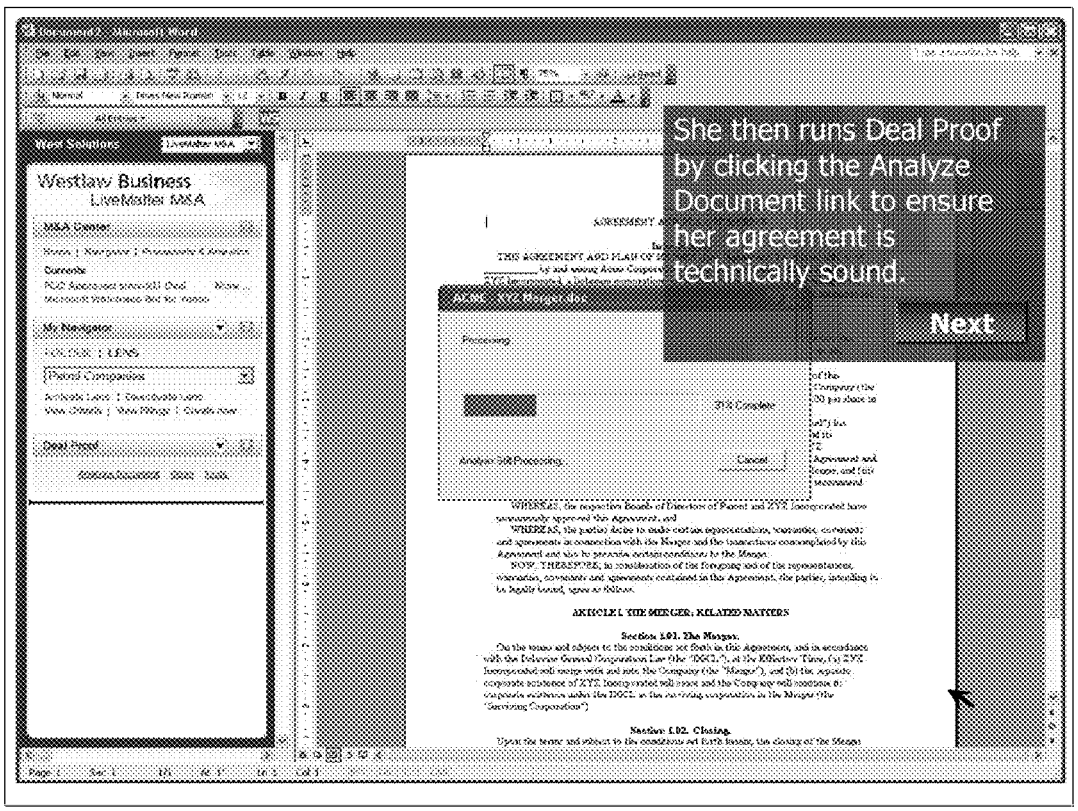
Figure 36:
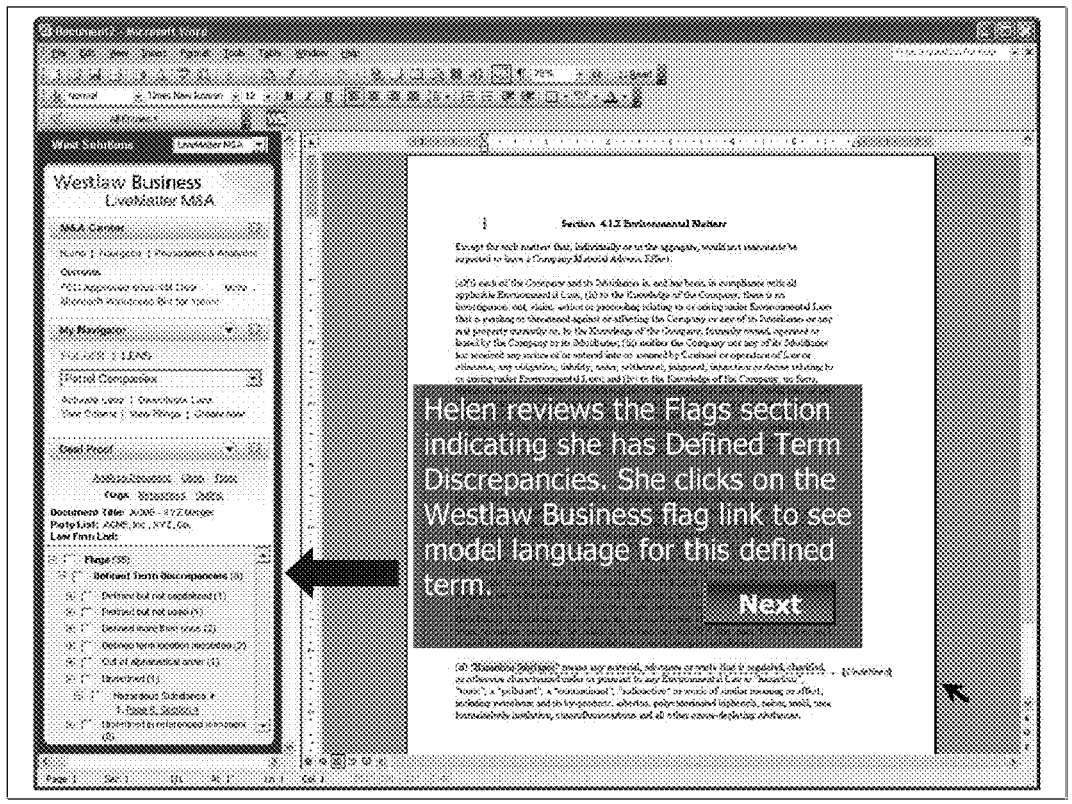
Figure 37:
Figure 38:
Figure 39:
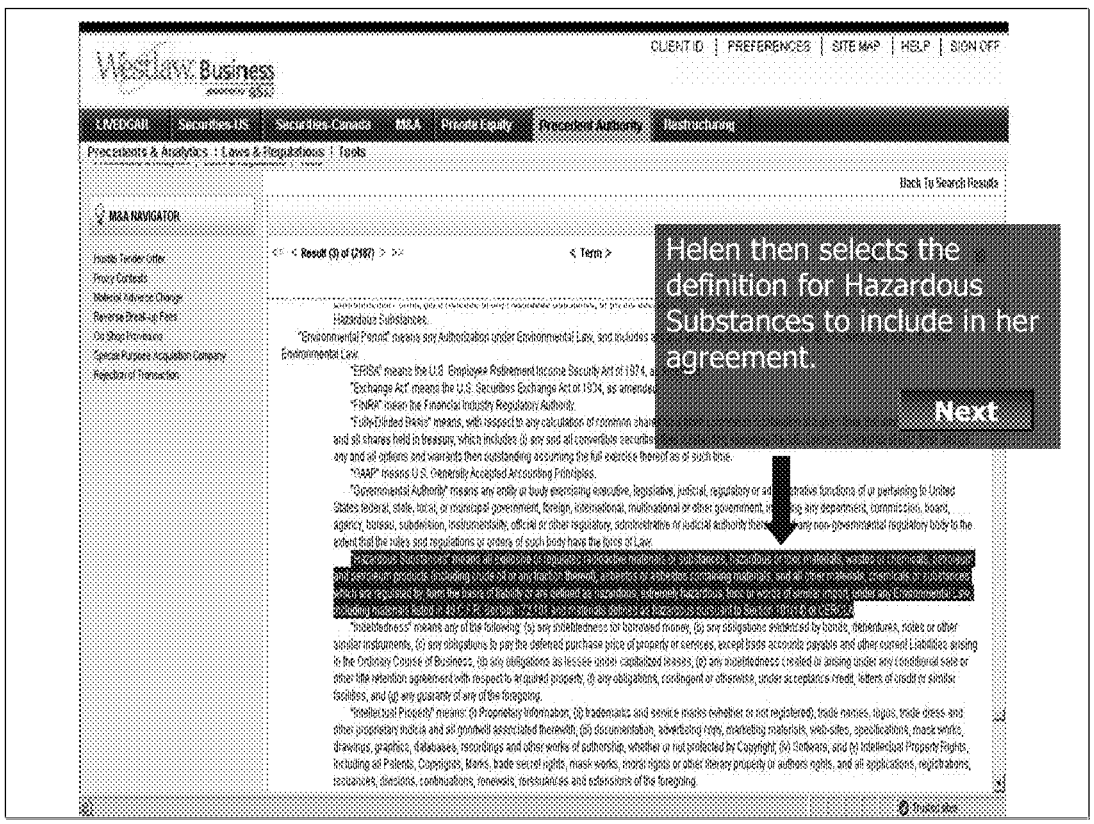
Figure 40:
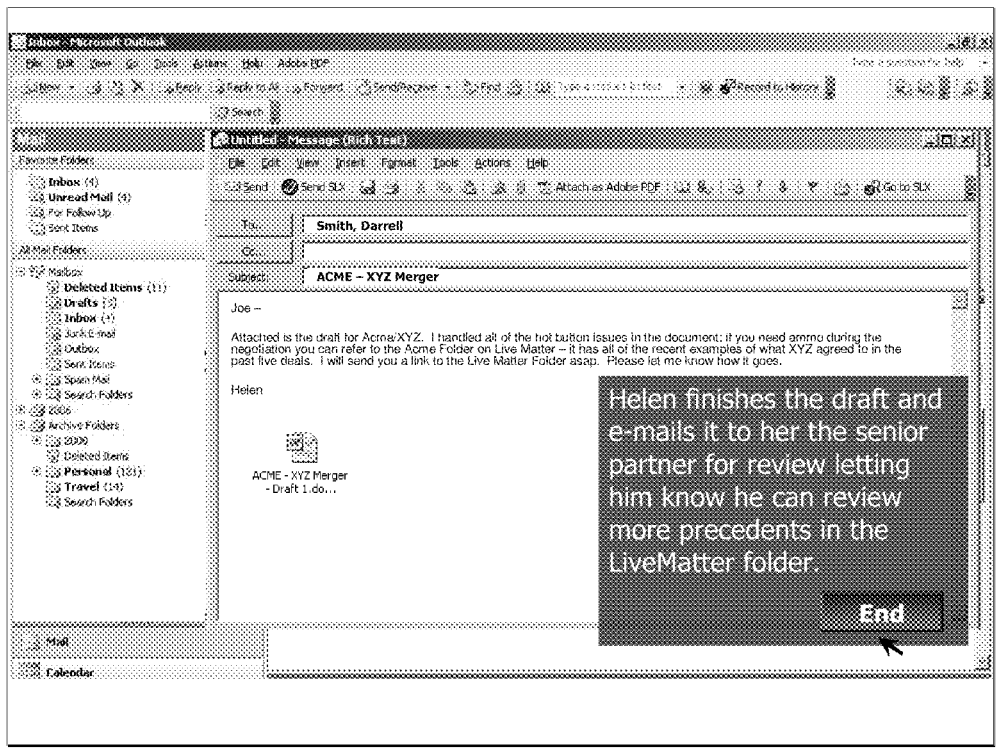

FIG. 3 shows a flow chart 300 of one or more exemplary methods of operating a system, such as system 100. Flow chart 300 includes blocks 310-350, which are arranged and described in a serial execution sequence in the exemplary embodiment. However, other embodiments execute two or more blocks in parallel using multiple processors or processor-like devices or a single processor organized as two or more virtual machines or sub processors. Other embodiments also alter the process sequence or provide different functional partitions to achieve analogous results. For example, some embodiments may alter the client-server allocation of functions, such that functions shown and described on the server side are implemented in whole or in part on the client side, and vice versa. Moreover, still other embodiments implement the blocks as two or more interconnected hardware modules with related control and data signals communicated between and through the modules. Thus, the exemplary process flow applies to software, hardware, and firmware implementations.

Block 310 entails receiving user selection of one or more redefined queries for contractual precedents. In the exemplary embodiment, this entails a user invoking display of a topical hierarchical outline of contractual provisions or issues, wherein each of the provision types or issues is associated with a predetermined query for searching one or more databases 110.

Block 320 entails executing searching databases 110 based on the user selected topic, or more precisely their corresponding predefined queries. In the exemplary embodiment, execution of the searches is performed using server 120 and ensues upon receipt of a search command from the user via a graphical user interface 139.

Block 330 entails filtering search results based on stored and predefined search results filters for contractual provisions. In the exemplary embodiment, this entails retrieving a predefined filter (my lens) associated with the user via his or her user data structure and then applying the filter against the search results. Execution continues at block 340.

Block 340 entails storing one or more of the provisions included in the filtered search results in a user folder. In the exemplary embodiment, this entails a user manually selecting one or more of the provisions for storage in a filter. In some embodiments, the user drags and drops the desired position into one or more of his corresponding filters via a graphical user interface.

Block 350 entails adding selected provisions from one or more of user folders into document within an active edit window of a word-processing application. In the exemplary embodiment, this entails a user selecting the word processing application for launch, selecting an existing document or new document for editing, and then selecting an icon for an add-on contract drafting tool. In response to selection of the icon, an interface for the contract drafting tool, for example, interface 139 or interface 200 in FIG. 2 is displayed. The user then selects a folder to review the contract provisions it contains. One or more of the contract provisions may be selected by drag and dropping into the active window. Some embodiments store the contract provisions with attribution information to enable the user to invoke display of the entire agreement from which it was extracted. In this case, displaying entails communicating with server 120 to retrieve the agreement.

FIGS. 4-40 shows another exemplary method and corresponding set of graphical user interfaces which may be used to replace and/or supplement the interfaces 139 and/or 200.

CONCLUSION

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

What is claimed is:

1. A method of providing contractual precedents, the method comprising:
   accessing a document via a word processing application in a first portion of a graphical user interface, the graphical user interface associated with the word processing application executed on a client access device;
   presenting, via an integration component integrated with the word processing application, a topical outline having a plurality of topics and a result folder in a second portion of the graphical user interface;
   receiving selection by a user of a topic from the topical outline, the topics in the topical outline being associated with predefined queries for contractual provisions in contractual documents;
   transmitting a predefined query associated with the topic to a server in response to the selection of the topic;
   receiving from the server for presentation in the result folder at least one contractual provision retrieved by the server from at least one contractual document based on the predefined query; and
   selectively adding the at least one contractual provision from the result folder in the second portion of the graphical user interface into the document accessed by the word processing application in the first portion of the graphical user interface.

2. The method of claim 1, further comprising:
   storing a plurality of contractual documents in a database;
   receive the predefined query from the integration component of the client access device at the server;
   executing the predefined query against the database to retrieve one or more contractual provisions from contractual documents; and
   returning the contractual provisions to the integration component of the client access device for presentation in the result folder.

3. The method of claim 2, further comprising storing the contractual provisions in a precedent storage folder of the server in association with an identifier corresponding to the user of the client access device.

4. The method of claim 3, further comprising:
   storing in the precedent storage folder at least one additional contractual provision retrieved by the server from the database in response to a predefined query of a second user having an identifier in association with the precedent storage folder; and
   transmitting the at least one additional contractual provision to the integration component of the client access device for presentation in the result folder.

5. The method of claim 4, further comprising selectively inserting the at least one additional contractual provision from the result folder in the second portion of the graphical user interface into the document accessed by the word processing application in the first portion of the graphical user interface.

6. The method of claim 2, further comprising storing a predefined filter for contractual documents in association with an identifier that corresponds to the user.

7. The method of claim 6, further comprising:
   filtering the contractual provisions retrieved from the database using the predefined filter that is associated with the identifier corresponding to the user; and returning filtered contractual provisions to the integration component of the client access device for presentation in the result folder.

8. The method of claim 6, further comprising:
storing an identifier corresponding to a second user in association with the predefined filter;
filtering one or more additional contractual provisions retrieved by the server from the database in response to a predefined query of the second user using the predefined filter associated with the identifier corresponding to the second user; and
returning filtered contractual provisions to the integration component of the client access device for presentation in the result folder.

9. A system to provide contractual precedents, the system comprising:
a client access device including a memory storing:
   a word processing application configured to access a document in a first portion of a graphical user interface, the graphical user interface associated with the word processing application; and
   an integration component integrated with the word processing application to present a topical outline and a result folder in a second portion of the graphical user interface, the integration component configured to:
      provide a plurality of topics in the topical outline, the topics associated with predefined queries for contractual provisions in contractual documents;
      transmit a predefined query to a server in response to selection by a user of a topic from the topical outline;
      receive from the server in the result folder at least one contractual provision retrieved by the server from at least one contractual document based on the predefined query; and
      enable selective insertion of the at least one contractual provision from the result folder in the second portion of the graphical user interface into the document accessed by the word processing application in the first portion of the graphical user interface.

10. The system of claim 9, further comprising:
a database storing a plurality of contractual documents; and
a server configured to:
   receive the predefined query from the integration component of the client access device;
   execute the predefined query against the database to retrieve one or more contractual provisions from contractual documents; and
   return the contractual provisions to the integration component of the client access device for presentation in the result folder.

11. The system of claim 10, wherein the server is configured to store the contractual provisions in a precedent storage folder in association with an identifier corresponding to the user of the client access device.

12. The system of claim 11, wherein the server is further configured to:
store in the precedent storage folder at least one additional contractual provision retrieved by the server from the database in response to a predefined query of a second user having an identifier in association with the result folder; and
transmit the at least one additional contractual provision to the integration component of the client access device for presentation in the precedent storage folder.

13. The system of claim 12, wherein the integration component of the client access device is further configured to enable selective insertion of the at least one additional contractual provision from the result folder in the second portion of the graphical user interface into the document accessed by the word processing application in the first portion of the graphical user interface.

14. The system of claim 10, wherein the server is further configured to store a predefined filter for contractual documents in association with an identifier that corresponds to the user.

15. The system of claim 14, wherein the server is further configured to:
filter the contractual provisions retrieved from the database using the predefined filter that is associated with the identifier corresponding to the user; and
return filtered contractual provisions to the integration component of the client access device for presentation in the result folder.

16. The system of claim 14, wherein the server is further configured to:
store an identifier corresponding to a second user in association with the predefined filter;
filter one or more additional contractual provisions retrieved by the server from the database in response to a predefined query of the second user using the predefined filter associated with the identifier corresponding to the second user; and
return filtered contractual provisions to the integration component of the client access device for presentation in the result folder.

* * * * *

UNITED STATES PATENT AND TRADEMARK OFFICE
CERTIFICATE OF CORRECTION

| | | |
|---|---|---|
| PATENT NO. | : 8,489,572 B2 | Page 1 of 1 |
| APPLICATION NO. | : 12/501356 | |
| DATED | : July 16, 2013 | |
| INVENTOR(S) | : Jennifer A. Duran et al. | |

It is certified that error appears in the above-identified patent and that said Letters Patent is hereby corrected as shown below:

In the Specification

At column 4, line 16, should read --...module 131 one or more...--.

Signed and Sealed this
Twelfth Day of November, 2013

Teresa Stanek Rea
*Deputy Director of the United States Patent and Trademark Office*